(12) United States Patent
Iwanami et al.

(10) Patent No.: US 10,769,505 B2
(45) Date of Patent: Sep. 8, 2020

(54) OPTICAL SENSOR DEVICE PERFORMING COLOR CORRECTION USING LIGHT ADJUSTMENT

(71) Applicants: Satoshi Iwanami, Kanagawa (JP);
Nobuyuki Satoh, Kanagawa (JP);
Hirohito Murate, Kanagawa (JP)

(72) Inventors: Satoshi Iwanami, Kanagawa (JP);
Nobuyuki Satoh, Kanagawa (JP);
Hirohito Murate, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/356,624

(22) Filed: Mar. 18, 2019

(65) Prior Publication Data
US 2019/0294935 A1  Sep. 26, 2019

(30) Foreign Application Priority Data

Mar. 20, 2018 (JP) .................................. 2018-053362
Feb. 8, 2019 (JP) .................................. 2019-021875

(51) Int. Cl.
| H04N 1/60 | (2006.01) |
| G06K 15/02 | (2006.01) |
| G06K 15/10 | (2006.01) |
| G01J 3/50 | (2006.01) |
| G01J 1/44 | (2006.01) |
| G06T 7/90 | (2017.01) |

(52) U.S. Cl.
CPC ............. G06K 15/1878 (2013.01); G01J 1/44 (2013.01); G01J 3/50 (2013.01); G06K 15/027 (2013.01); G06K 15/102 (2013.01); G06T 7/90 (2017.01); H04N 1/6027 (2013.01); *G06T 2207/10024* (2013.01)

(58) Field of Classification Search
CPC .......... H04N 1/6027; H04N 9/73; H04N 9/69; G06K 15/1878; G06K 15/027; G06K 15/102
USPC ........................ 358/1.15, 518, 516, 519, 3.27
See application file for complete search history.

(56) References Cited

U.S. PATENT DOCUMENTS

2009/0296085 A1* 12/2009 Mestha .............. H04N 1/00013
356/319
2012/0236308 A1   9/2012 Satoh
(Continued)

FOREIGN PATENT DOCUMENTS

JP    2002-125135    4/2002
JP    2009-156872    7/2009
(Continued)

*Primary Examiner* — Jamares Q Washington
(74) *Attorney, Agent, or Firm* — Duft & Bornsen, PC

(57) ABSTRACT

An optical sensor device includes a first light source, a second light source, a sensor, and control circuitry. The first light source has a plurality of peak wavelengths in a wavelength range of 400 nm to 780 nm. The second light source emits ultraviolet light. The control circuitry adjusts a light amount of the first light source based on an output of the sensor in a state the first light source is on and the second light source is off, adjusts a light amount of the second light source based on an output of the sensor in a state the second light source is on and the first light source is off, and acquires a correction value of data output by the sensor, based on an output of the sensor in a state each of the first and second light sources is on with the light amount adjusted.

8 Claims, 17 Drawing Sheets

(56) References Cited

U.S. PATENT DOCUMENTS

| | | | |
|---|---|---|---|
| 2013/0027721 A1* | 1/2013 | Kobayashi | H04N 1/6033 358/1.9 |
| 2013/0135484 A1 | 5/2013 | Satoh et al. | |
| 2013/0242361 A1 | 9/2013 | Matsumoto et al. | |
| 2013/0258368 A1 | 10/2013 | Shigemoto et al. | |
| 2013/0328487 A1* | 12/2013 | Yoshida | G03G 15/043 315/152 |
| 2015/0146053 A1 | 5/2015 | Satoh et al. | |
| 2015/0158309 A1 | 6/2015 | Fujii et al. | |
| 2016/0004202 A1 | 1/2016 | Morita et al. | |
| 2016/0080611 A1 | 3/2016 | Yorimoto et al. | |
| 2016/0366288 A1 | 12/2016 | Sasa et al. | |

FOREIGN PATENT DOCUMENTS

| | | |
|---|---|---|
| JP | 2013-007610 | 1/2013 |
| JP | 2014-137247 | 7/2014 |
| WO | WO2016/093043 A1 | 6/2016 |

\* cited by examiner

| PATCH NUMBER | Rd | Gd | Bd | Ld | ad | bd | Xd | Yd | Zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| ... | | | | | | | | | |
| 72 | | | | | | | | | |

INITIAL REFERENCE RGB VALUE (RdGdBd) — covers Rd, Gd, Bd columns. Tb1.

| SHEET TYPE | R | G | B |
|---|---|---|---|
| SHEET TYPE A | 20-40 | 80-100 | 120-140 |
| SHEET TYPE B | 60-80 | 100-120 | 140-160 |
| SHEET TYPE C | 100-120 | 120-140 | 180-200 |
| SHEET TYPE D | 120-140 | 160-180 | 220-240 |

# OPTICAL SENSOR DEVICE PERFORMING COLOR CORRECTION USING LIGHT ADJUSTMENT

CROSS-REFERENCE TO RELATED APPLICATIONS

This patent application is based on and claims priority pursuant to 35 U.S.C. § 119(a) to Japanese Patent Application Nos. 2018-053362, filed on Mar. 20, 2018, and 2019-021875, filed on Feb. 8, 2019, in the Japan Patent Office, the entire disclosure of each of which is hereby incorporated by reference herein.

BACKGROUND

Technical Field

Aspects of the present disclosure relate to an optical sensor device, a colorimetric device, and an image forming apparatus.

Related Art

A technique is known to capture images of a reference pattern and an object whose color is to be measured to correct the color of the object.

For example, a colorimetric device for colorimetry through spectral diffraction is proposed. The colorimetric device includes a light source. The light source includes a light emitting diode having a peak value of light emission intensity in a wavelength range of 380 nm to 420 nm, and irradiates an object whose color is to be measured with white light.

SUMMARY

In an aspect of the present disclosure, there is provided an optical sensor device that includes a first light source, a second light source, a sensor, and control circuitry. The first light source has a plurality of peak wavelengths in a wavelength range of from 400 nm to 780 nm. The second light source emits ultraviolet light. The sensor receives light emitted by the first light source or the second light source and reflected by an object. The control circuitry adjusts a light amount of the first light source based on an output of the sensor in a state where the first light source is turned on and the second light source is turned off, adjusts a light amount of the second light source based on an output of the sensor in a state where the second light source is turned on and the first light source is turned off, and acquires a correction value of data output by the sensor, based on an output of the sensor in a state where each of the first light source and the second light source is turned on with the light amount adjusted by the control circuitry.

In another aspect of the present disclosure, there is provided a colorimetric device that includes the optical sensor device and a reference chart to be captured together with an object by the optical sensor device. The control circuitry calculates a colorimetric value of the object based on image capturing data of the object and the reference chart that are captured by the optical sensor device.

In still another aspect of the present disclosure, there is provided an image forming apparatus that includes an image output device and the colorimetric device. The image output device outputs an image onto a recording medium. The colorimetric device defines an image output by the image output device as the object and calculates a colorimetric value of the image. After the colorimetric device calculates the colorimetric value, the image output device outputs an image based on image data in which color adjustment is performed using the colorimetric value.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4-1 is a vertical cross-sectional view of an image capturing unit;

FIG. 4-2 is a top perspective view of the inside of the image capturing unit;

FIG. 4-3 is a plan view of a bottom surface portion of a housing as seen from an X2 direction in FIG. 4-1;

Figure 1:
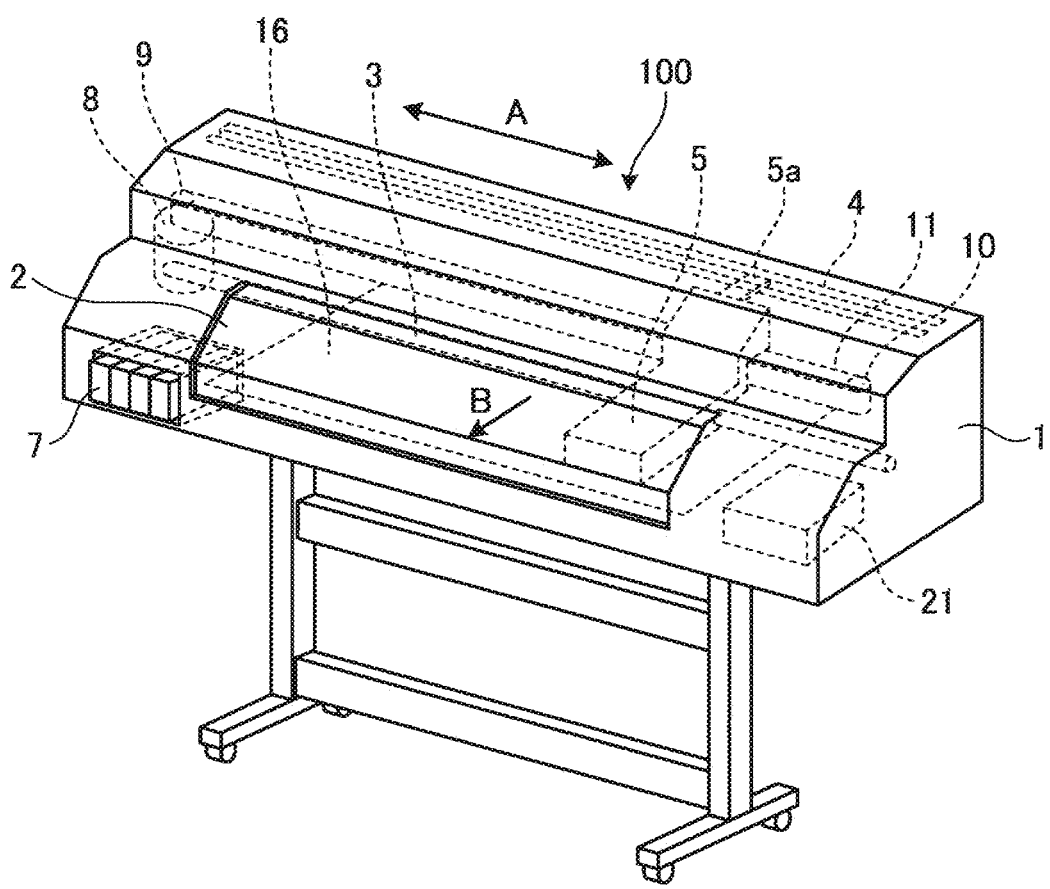
FIG. 1 is a perspective view of the inside of an image forming apparatus according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

An optical sensor device, a colorimetric device, and an image forming apparatus according to embodiments of the present disclosure will be described in detail below with reference to accompanying drawings. Although, in the embodiments described below, an inkjet printer is illustrated as an example of the image forming apparatus to which the invention is applied, embodiments of the present disclosure can be widely applied to various types of image forming apparatuses that output images onto recording media.

<Mechanical Configuration of Image Forming Apparatus>

Figure 2:
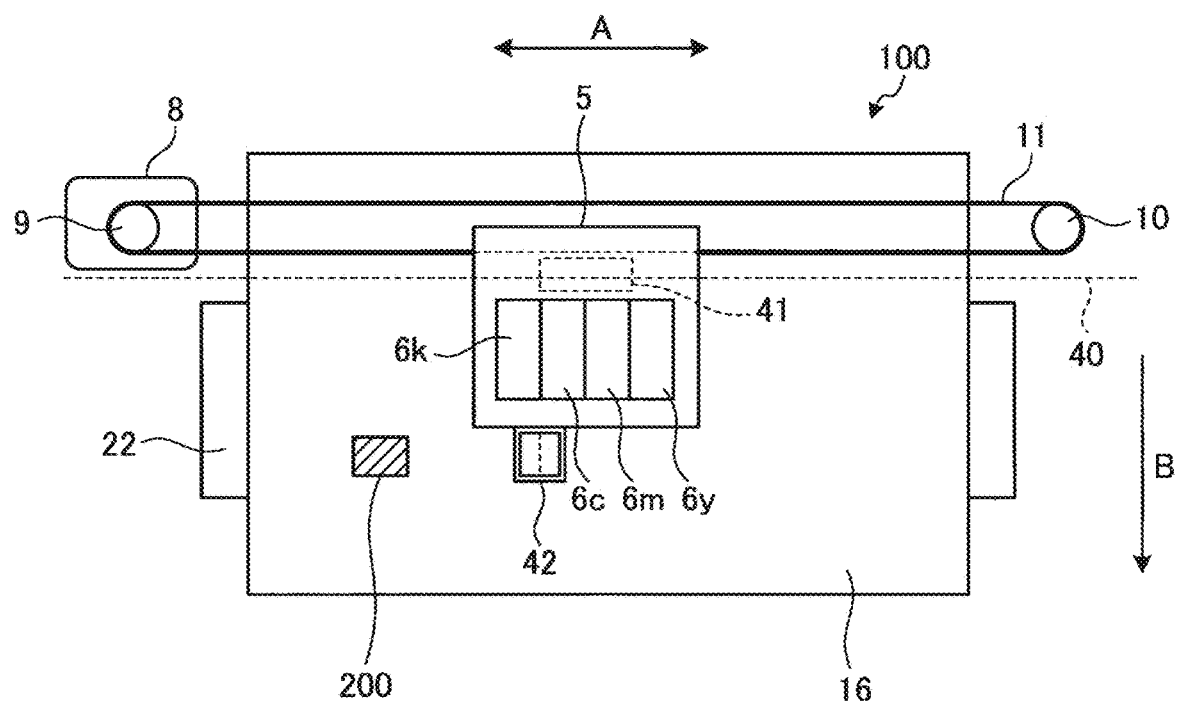
FIG. 2 is a top view of the internal mechanical configuration of the image forming apparatus.
Figure 3:
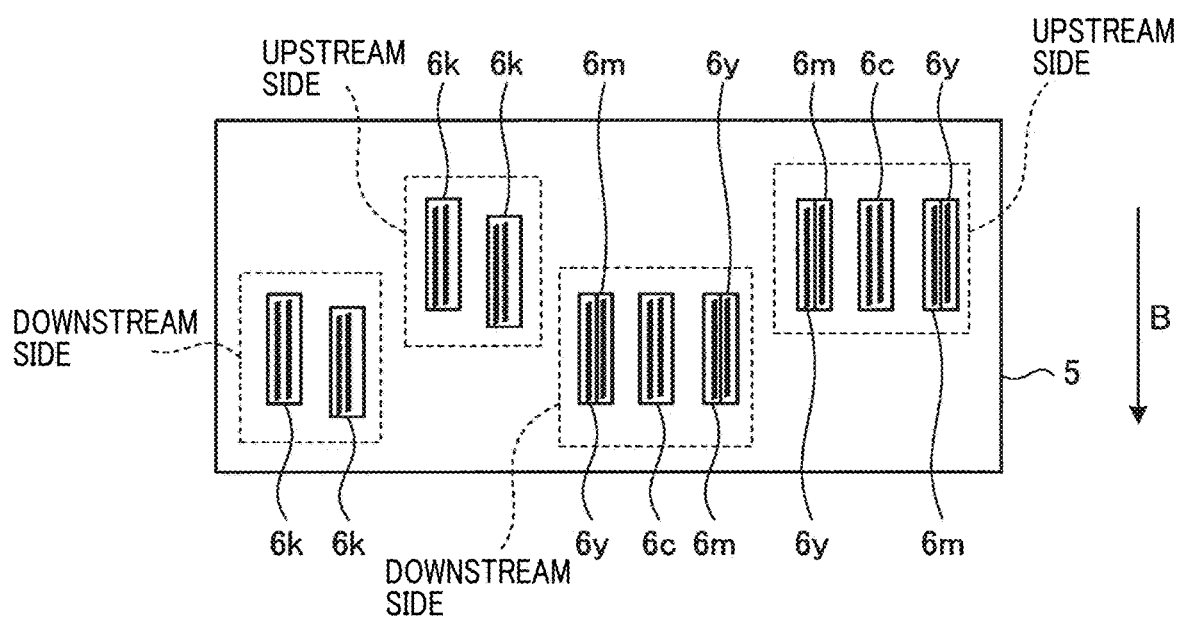
FIG. 3 illustrates an arrangement example of recording heads mounted on a carriage.

The mechanical configuration of an image forming apparatus 100 according to the embodiment will now be described with reference to FIGS. 1 to 3. FIG. 1 is a perspective view of the inside of the image forming apparatus 100 according to the first embodiment. FIG. 2 is a top view of the internal mechanical configuration of the image forming apparatus 100. FIG. 3 illustrates an arrangement example of recording heads 6 mounted on a carriage 5.

As illustrated in FIG. 1, the image forming apparatus 100 according to the embodiment includes the carriage 5. The carriage 5 reciprocates in a main-scanning direction (arrow A direction in FIG. 1) to form an image on a recording medium 16 intermittently conveyed in a sub-scanning direction (arrow B direction in FIG. 1). A main guide rod 3 extending along the main-scanning direction supports the carriage 5. The carriage 5 includes a coupling piece 5a. The coupling piece 5a engages with a sub guide 4 provided in parallel to the main guide rod 3 to stabilize the position of the carriage 5.

As illustrated in FIG. 2, the carriage 5 includes recording heads 6y, 6m, and 6c and a plurality of recording heads 6k (recording heads 6y, 6m, 6c, and 6k will hereinafter be referred to as a recording head 6 when called collectively). The recording heads 6y, 6m, 6c, and 6k discharge yellow (Y) ink, magenta (M) ink, cyan (C) ink, and black (Bk) ink, respectively. The recording head 6 is mounted in the carriage 5 such that a discharge surface (nozzle surface) of the recording head 6 faces downward (on a side of the recording medium 16). The recording head 6 is a main part of an image output device.

A cartridge 7 is an ink supplier for supplying ink to the recording head 6. The cartridge 7 is not mounted in the carriage 5, but disposed at a predetermined position in the image forming apparatus 100. The cartridge 7 and the recording head 6 are coupled with a pipe (not illustrated). Ink is supplied from the cartridge 7 to the recording head 6 through the pipe.

The carriage 5 is coupled to a timing belt 11 wound around a driving pulley 9 and a driven pulley 10. The driving pulley 9 is rotated by driving of a main scanning motor 8. The driven pulley 10 has a mechanism for adjusting the distance to the driving pulley 9, and applies predetermined tension to the timing belt 11. The driven main scanning motor 8 delivers the timing belt 11 to reciprocate the carriage 5 in the main-scanning direction. For example, as illustrated in FIG. 2, movement of the carriage 5 in the main-scanning direction is controlled based on an encoder value. The encoder value is obtained by an encoder sensor 41 in the carriage 5 detecting a mark of an encoder sheet 40.

The image forming apparatus 100 according to the embodiment also includes a maintenance mechanism 21 for maintaining reliability of the recording head 6. For example, the maintenance mechanism 21 cleans or caps the discharge surface of the recording head 6. The maintenance mechanism 21 also discharges unnecessary ink from the recording head 6.

As illustrated in FIG. 2, a platen plate 22 is provided at a position facing the discharge surface of the recording head 6. The platen plate 22 supports the recording medium 16 when ink is discharged from the recording head 6 onto the recording medium 16. The image forming apparatus 100 according to the embodiment is a wide machine having a long moving distance of the carriage 5 in the main-scanning direction. The platen plate 22 includes a plurality of plate members connected in the main-scanning direction (moving direction of the carriage 5). The recording medium 16 is nipped by conveyance rollers driven by a sub-scanning motor (not illustrated), and intermittently conveyed on the platen plate 22 in the sub-scanning direction.

The recording head 6 includes a plurality of nozzle arrays. The recording head 6 discharges ink from the nozzle arrays onto the recording medium 16 conveyed on the platen plate 22 to form an image on the recording medium 16. In the embodiment, in order to secure a larger width of an image that can be formed on the recording medium 16 by one scanning of the carriage 5, as illustrated in FIG. 3, the carriage 5 includes the upstream recording head 6 and the downstream recording head 6. The carriage 5 includes the recording heads 6k, which discharge black ink, twice as many as each of the recording heads 6y, 6m, and 6c, which discharge color ink. The recording heads 6y and 6m are arranged separately on the right and left sides. The purpose of the arrangement is to equalize the color-superposition orders in the reciprocating operation of the carriage 5 and prevent color change between in a forward path and in a backward path. FIG. 3 illustrates one example of arrangements of the recording head 6, and the arrangement illustrated in FIG. 3 is not limitative.

Each of the above-described components of the image forming apparatus 100 according to the embodiment is disposed inside an outer casing 1. The outer casing 1 has an openable and closable cover 2. Upon maintenance of the image forming apparatus 100 and occurrence of a paper jam, the cover 2 can be opened to perform work on each component inside the outer casing 1.

The image forming apparatus 100 according to the embodiment intermittently conveys the recording medium 16 in the sub-scanning direction. While the conveyance of the recording medium 16 in the sub-scanning direction is stopped, the image forming apparatus 100 moves the carriage 5 in the main-scanning direction, and discharges ink from the nozzle arrays of the recording head 6 in the carriage 5 onto the recording medium 16 on the platen plate 22 to form an image on the recording medium 16.

In particular, when calibration for adjusting the output characteristics of the image forming apparatus 100 is performed, the image forming apparatus 100 discharges ink from the nozzle arrays of the recording head 6 in the carriage 5 onto the recording medium 16 on the platen plate 22 to form a patch image 200, which is to be a colorimetric target, on the recording medium 16. The patch image 200 is obtained by the image forming apparatus 100 outputting a patch of reference color, and reflects the output characteristics of the image forming apparatus 100. The image forming apparatus 100 generates a color conversion parameter based on the difference between a colorimetric value of the patch image 200 and a color specification value in a standard color space of the reference color according to the colorimetric value, and performs color conversion with the color conversion parameter. The image forming apparatus 100 outputs an image based on image data after the color conversion. In such a way, the image forming apparatus 100 can output an image with high reproducibility.

The image forming apparatus 100 according to the embodiment includes a colorimetric device for measuring the color of the patch image 200 output onto the recording medium 16. The colorimetric device defines the patch image 200, which is a colorimetric target and formed on the recording medium 16 by the image forming apparatus 100, as an object, and includes an image capturing unit 42 that captures the patch image 200 and a later-described reference chart 400. The colorimetric device calculates a colorimetric value of the patch image 200 based on image data of the reference chart 400 obtained by image capturing of the image capturing unit 42 and image data of the patch image 200 obtained by image capturing of the image capturing unit 42. The colorimetric device has not only a function of calculating a colorimetric value of the patch image 200 but other functions. The other functions include a function of calculating an amount of positional deviation of an image output by the image forming apparatus 100 by using the image data obtained by image capturing of the image capturing unit 42, a function of calculating an amount of positional deviation of an image formed by the image forming apparatus 100 by using the image data obtained by image capturing of the image capturing unit 42, and a function of calculating the dot diameter of an image output by the image forming apparatus 100.

As illustrated in FIG. 2, the image capturing unit 42 is fixed to the carriage 5, and reciprocates in the main-scanning direction integrally with the carriage 5. The image capturing unit 42 defines an image (patch image 200, which is to be the colorimetric target, in the case of measuring the color of the patch image 200) on the recording medium 16 as an object. When moving to the position facing to the object, the image capturing unit 42 acquires one frame of image data containing the object and the reference chart 400.

<Specific Example of Image Capturing Unit>

Figures 1, 4:
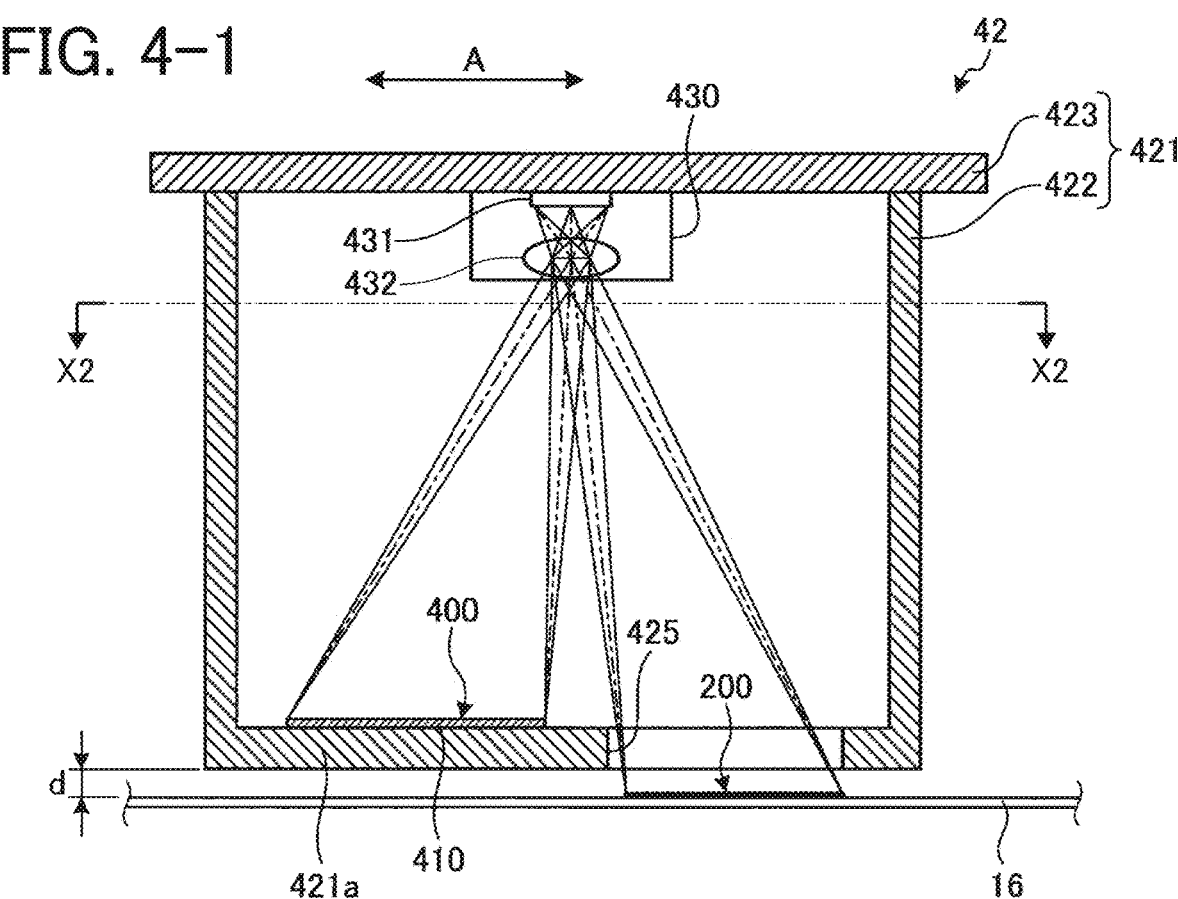
Figures 2, 4:
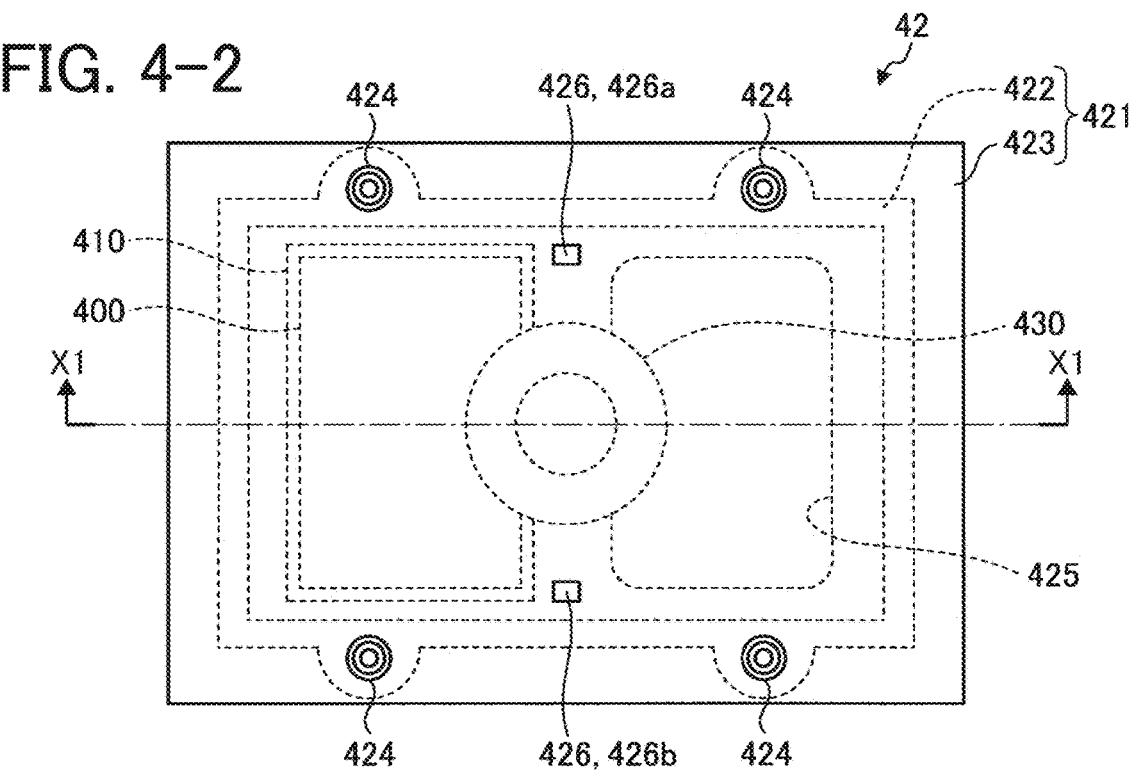
Figures 3, 4:
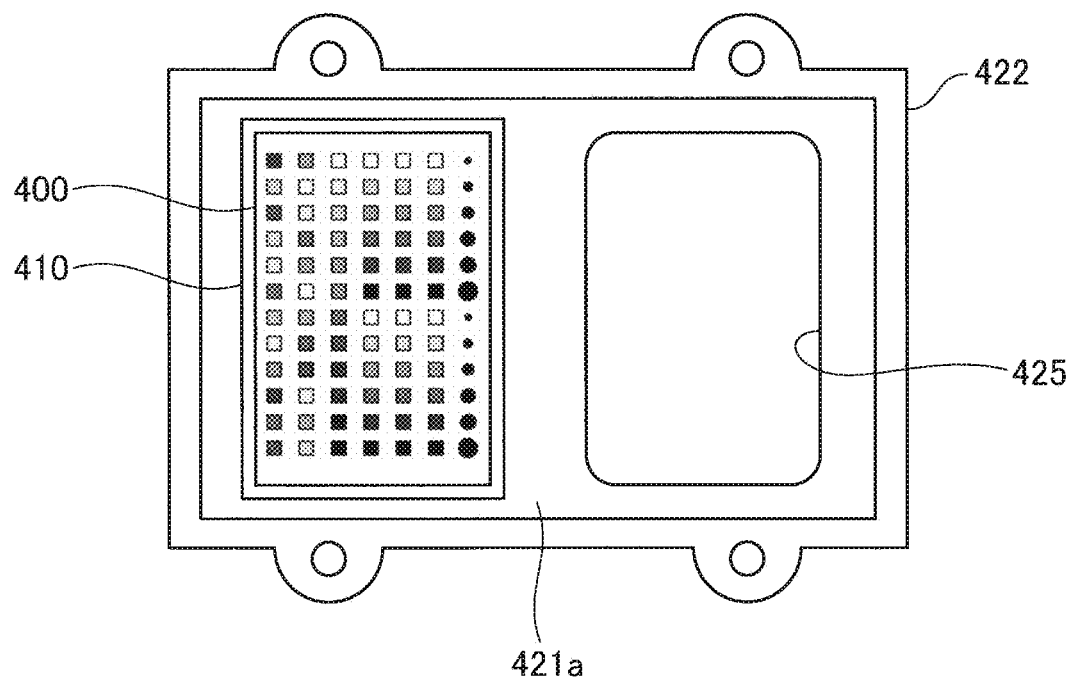

FIGS. 4-1 to 4-3 illustrate a specific example of the image capturing unit 42. FIG. 4-1 is a vertical cross-sectional view (line X1-X1 cross-sectional view in FIG. 4-2) of the image capturing unit 42. FIG. 4-2 is a top perspective view of the inside of the image capturing unit 42. FIG. 4-3 is a plan view of a bottom surface portion of a housing as seen from an X2 direction in FIG. 4-1.

The image capturing unit 42 includes a housing 421. The housing 421 includes a combination of a frame 422 and a substrate 423. The frame 422 has a bottomed cylindrical shape opened on one end side corresponding to a top surface of the housing 421. The substrate 423 is fastened to the frame 422 with a fastener 424 to be integrated with the frame 422, so that the substrate 423 closes the open end of the frame 422 to be the top surface of the housing 421.

The housing 421 is fixed to the carriage 5 such that a bottom surface portion 421a of the housing 421 faces the recording medium 16 on the platen plate 22 across a predetermined gap d. The bottom surface portion (first surface) 421a, facing the recording medium 16, of the housing 421 has an opening 425 for enabling the object (patch image 200) on the recording medium 16 to be captured from the inside of the housing 421.

A sensor unit 430 for capturing an image is provided inside the housing 421. The sensor unit 430 includes a two-dimensional image sensor 431 and an image forming lens 432. The two-dimensional image sensor 431 includes a charge-coupled device (CCD) sensor and a complementary metal-oxide semiconductor (CMOS) sensor. The image forming lens 432 forms an optical image in an image capturing range of the sensor unit 430 on a sensor surface of the two-dimensional image sensor 431. For example, the two-dimensional image sensor 431 is mounted on an inner surface (component mounting surface) of the substrate 423 so that the sensor surface faces the bottom surface portion 421a of the housing 421. In order to maintain a positional relationship determined in accordance with optical characteristics of the image forming lens 432, the image forming lens 432 is fixed in the state of being positioned with respect to the two-dimensional image sensor 431.

A chart plate 410 having the reference chart 400 is disposed on an inner surface side, facing the sensor unit 430, of the bottom surface portion 421a of the housing 421 so as to be adjacent to the opening 425 in the bottom surface portion 421a. For example, a surface of the chart plate 410 opposite to the surface having the reference chart 400 is defined as a bonding surface. The chart plate 410 is bonded to the inner surface side of the bottom surface portion 421a of the housing 421 with, for example, bonding material, and held in the state of being fixed to the housing 421. The reference chart 400 may be formed not on the chart plate 410 but directly on the inner surface side of the bottom surface portion 421a of the housing 421. In this case, the chart plate 410 is unnecessary. The sensor unit 430 captures the reference chart 400 together with the object (patch image 200). Details of the reference chart 400 will be described later.

An illumination light source 426 is provided inside the housing 421. When the sensor unit 430 captures images of the object (patch image 200) and the reference chart 400, the illumination light source 426 illuminates the object (patch image 200) and the reference chart 400. Examples of the illumination light source 426 include a light emitting diode (LED). In the embodiment, four LEDs are used as the illumination light source 426. These four LEDs used as the illumination light source 426 are mounted on the inner surface of the substrate 423, for example, together with the two-dimensional image sensor 431 of the sensor unit 430. The illumination light source 426 is required to be disposed at a position at which the object (patch image 200) and the reference chart 400 can be illuminated. The illumination light source 426 is not necessarily required to be directly mounted on the substrate 423. Although, in the embodiment, an LED is used as the illumination light source 426, the type of the light source is not limited to the LED. For example, an organic electro-luminescence (EL) may be used as the illumination light source 426.

The four LEDs used as the illumination light sources 426 include two white LEDs 426a and two ultraviolet (UV) LEDs 426b. The white LED 426a is a first light source having a plurality of peak wavelengths in a wavelength range of 400 to 780 nm. The UV LED 426b is a second light source capable of emitting ultraviolet light.

The UV LED 426b is disposed outside or inside the white LED 426a so that the UV LED 426b and the white LED 426A are symmetric with respect to the sensor unit 430. In the present embodiment, the UV LED 426b is disposed inside the white LED 426a.

In the embodiment, as illustrated in FIG. 4-2, the four LEDs used as the illumination light source 426 are disposed such that the projected positions on the bottom surface portion 421a as vertically seen from the side of the substrate 423 to the side of the bottom surface portion 421a of the housing 421 are within a region between the opening 425 and the reference chart 400. These four LEDs are disposed such that the two white LEDs 426a are symmetric about the sensor unit 430 and the two UV LEDs 426b are symmetric about the sensor unit 430. In other words, a line connecting the four LEDs used as the illumination light sources 426 passes through the center of the image forming lens 432 of the sensor unit 430, and the opening 425 in the bottom surface portion 421a of the housing 421 and the reference chart 400 are disposed at positions axisymmetric with respect to the line connecting the four LEDs. Such an arrangement of the four LEDs used as the illumination light sources 426 enables the object (patch image 200) and the reference chart 400 to be illuminated under substantially the same condition.

Reduction in the size of the gap d between the bottom surface portion 421a of the housing 421 and the recording medium 16 enables the difference between an optical path length from the sensor unit 430 to the object (patch image 200) and an optical path length from the sensor unit 430 to the reference chart 400 to be within the range of the depth of field of the sensor unit 430. The image capturing unit 42 of the embodiment captures images of the object (patch image 200) outside the housing 421 and the reference chart 400 inside the housing 421 with the sensor unit 430. When the difference between the optical path length from the sensor unit 430 to the object (patch image 200) and the optical path length from the sensor unit 430 to the reference chart 400 exceeds the range of the depth of field of the sensor unit 430, the image capturing unit 42 cannot capture an image focused on both of the object (patch image 200) and the reference chart 400.

The difference between the optical path length from the sensor unit 430 to the object (patch image 200) and the optical path length from the sensor unit 430 to the reference chart 400 approximately corresponds to a value obtained by adding the value of the gap d to the thickness of the bottom surface portion 421a of the housing 421. A sufficiently small value of the gap d enables the difference between the optical path length from the sensor unit 430 to the object (patch image 200) and the optical path length from the sensor unit 430 to the reference chart 400 to be within the range of the depth of field of the sensor unit 430, and enables an image focused on both of the object (patch image 200) and the reference chart 400 to be captured. For example, the gap d of approximately 1 to 2 mm enables the difference between the optical path length from the sensor unit 430 to the object (patch image 200) and the optical path length from the sensor unit 430 to the reference chart 400 to be within the range of the depth of field of the sensor unit 430.

The depth of field of the sensor unit 430 is a characteristic inherent in the sensor unit 430. The characteristic is determined in accordance with, for example, an aperture value of the sensor unit 430, a focal length of the image forming lens 432, and a distance between the sensor unit 430 and the object. The sensor unit 430 in the image capturing unit 42 of the embodiment is designed such that, when the gap d between the bottom surface portion 421a of the housing 421 and the recording medium 16 is set to be a sufficiently small value of, for example, approximately 1 to 2 mm, the difference between the optical path length from the sensor unit 430 to the object (patch image 200) and the optical path length from the sensor unit 430 to the reference chart 400 is within the range of the depth of field.

<Schematic Configuration of Control Mechanism of Image Forming Apparatus>

Figure 5:
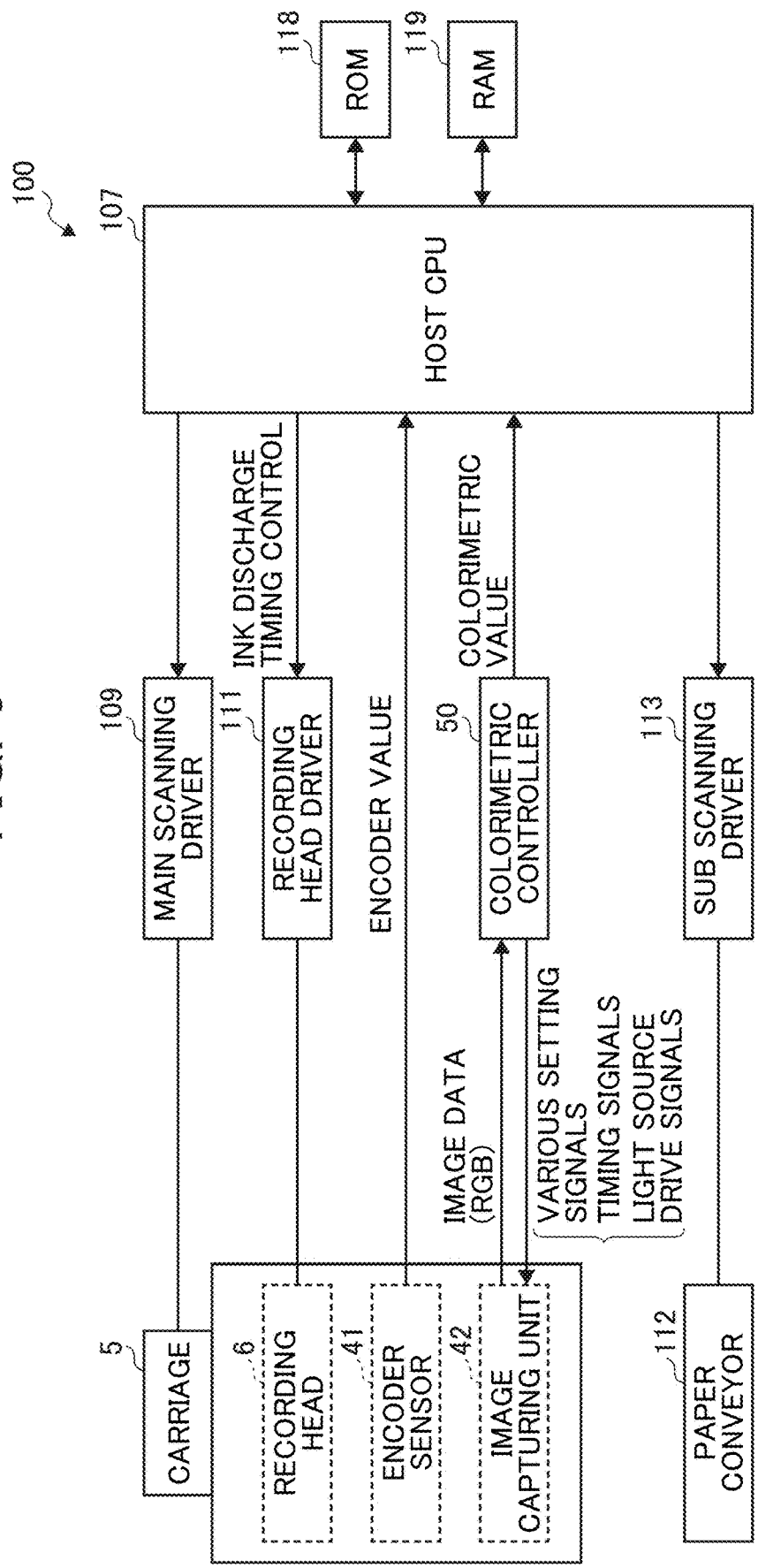
FIG. 5 is a block diagram illustrating the schematic configuration of a control mechanism of the image forming apparatus.

The schematic configuration of a control mechanism of the image forming apparatus 100 according to the embodiment will now be described with reference to FIG. 5. FIG. 5 is a block diagram illustrating the schematic configuration of the control mechanism of the image forming apparatus 100.

The control mechanism of the image forming apparatus 100 according to the embodiment includes a host central processing unit (CPU) 107, a read only memory (ROM) 118, a random access memory (RAM) 119, a main scanning driver 109, a recording head driver 111, a colorimetric controller 50, a paper conveyor 112, a sub scanning driver 113, the recording head 6, the encoder sensor 41, and the image capturing unit 42. As described above, the recording head 6, the encoder sensor 41, and the image capturing unit 42 are mounted in the carriage 5.

The host CPU 107 supplies data of an image to be formed on the recording medium 16 and drive control signals (pulse signals) to each driver, and wholly controls the image forming apparatus 100. Specifically, the host CPU 107 controls driving of the carriage 5 in the main-scanning direction via the main scanning driver 109. The host CPU 107 controls timing of ink discharge of the recording head 6 via the recording head driver 111. The host CPU 107 controls driving of the paper conveyor 112 including the conveyance roller and the sub-scanning motor via the sub scanning driver 113.

The encoder sensor 41 outputs an encoder value obtained by detecting a mark of the encoder sheet 40 to the host CPU 107. The host CPU 107 controls the driving of the carriage in the main-scanning direction via the main scanning driver 109 based on the encoder value from the encoder sensor 41.

As described above, the image capturing unit 42 captures the patch image 200 and the reference chart 400 on the chart plate 410 disposed inside the housing 421 with the sensor unit 430 at the time of measuring the color of the patch image 200 on the recording medium 16, and outputs image data containing the patch image 200 and the reference chart 400 to the colorimetric controller 50.

Figure 6:
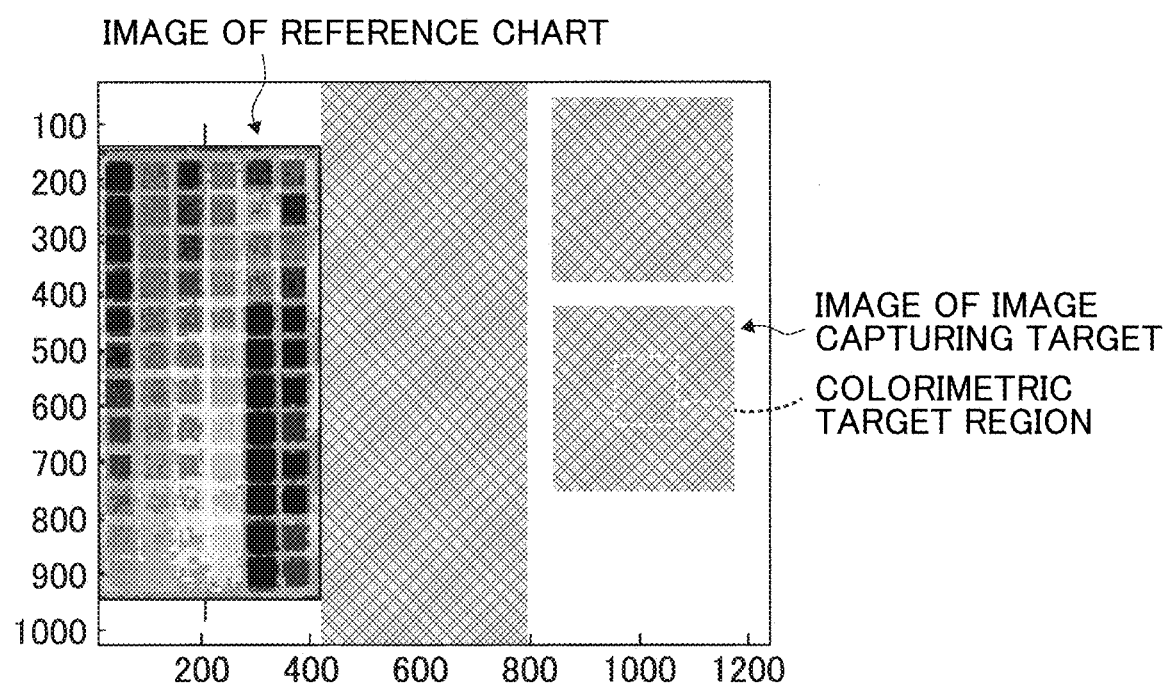
FIG. 6 illustrates one example of image data obtained by capturing images of a reference chart and an image capturing target at the same time.
Figure 8:
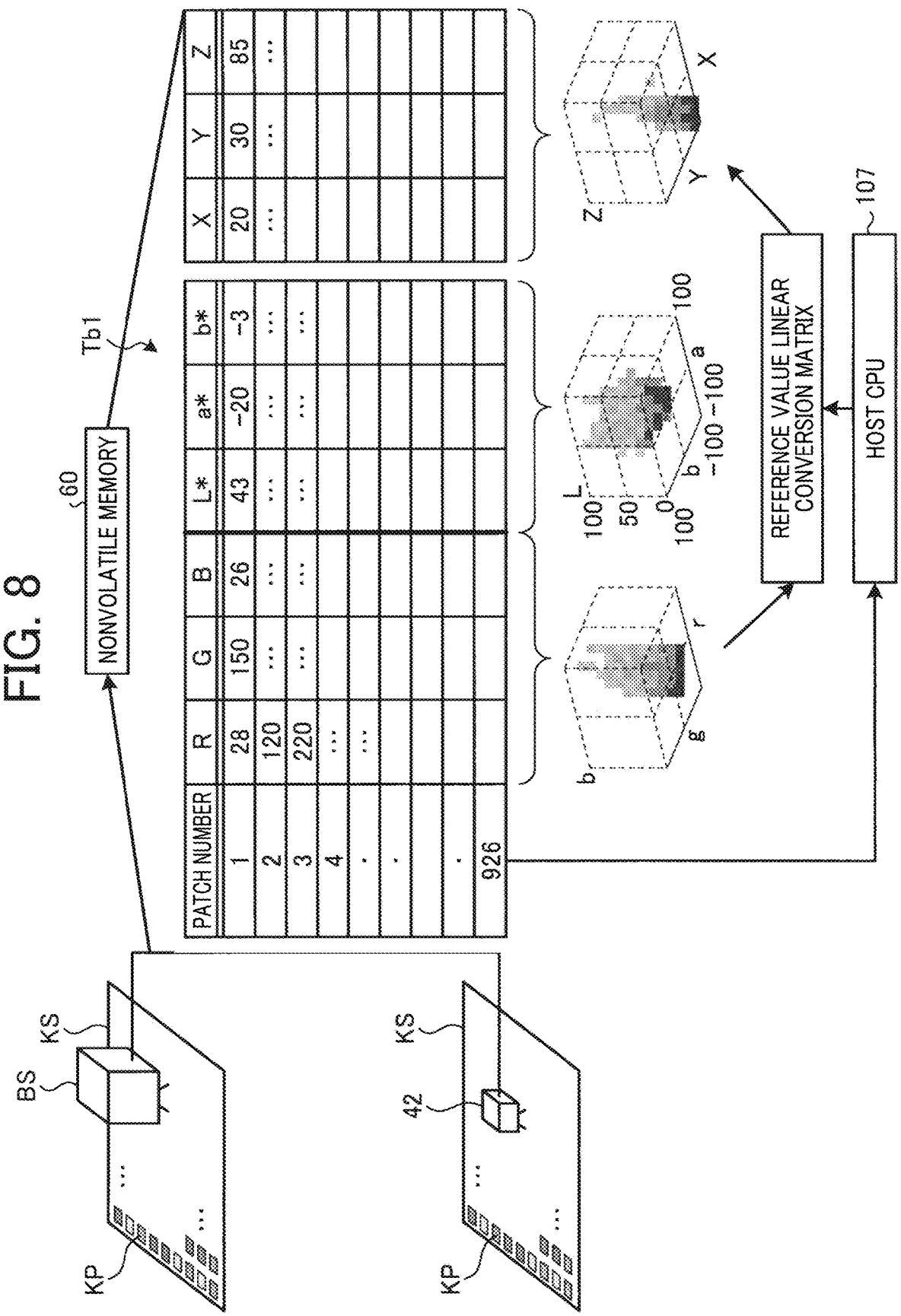
FIG. 8 illustrates processing of acquiring a reference colorimetric value and a reference RGB value and processing of generating a reference value linear conversion matrix.

FIG. 6 illustrates one example of image data obtained by capturing the images of the reference chart and an image capturing target at the same time. As illustrated in FIG. 6, the image capturing unit 42 captures an image of each patch of the reference chart 400 inside the frame 422. The image data illustrated in FIG. 8 is an example obtained by capturing an image of a colorimetric target on the right half surface with the reference chart 400 fixed to the two-dimensional image sensor 431 on the left half surface. An RGB signal value of the image capturing target is obtained by averaging a part of right image capturing region. In the example in FIG. 6, the RGB signal value is obtained by averaging RGB signals inside a dashed region. Averaging a large number of pixels can reduce influence of noise, and improve Bit resolution.

The colorimetric controller 50 calculates a colorimetric value (color specification value in the standard color space) of the patch image 200 based on the patch image 200 acquired from the image capturing unit 42. The colorimetric value of the patch image 200 calculated by the colorimetric controller 50 is transmitted to the host CPU 107. The colorimetric controller 50 constitutes the colorimetric device together with the image capturing unit 42. Although, in the embodiment, the colorimetric controller 50 is separated from the image capturing unit 42, the colorimetric controller 50 may be integrated with the image capturing unit 42. For example, a control circuit that functions as the colorimetric controller 50 may be mounted on the substrate 423 of the image capturing unit 42.

The colorimetric controller 50 supplies, for example, various setting signals, timing signals, and light source drive signals to the image capturing unit 42, and controls image capturing with the image capturing unit 42. The various setting signals include a signal for setting an operation mode of the sensor unit 430 and a signal for setting image capturing conditions such as a shutter speed and gain of automatic gain control (AGC). The colorimetric controller 50 acquires these setting signals from the host CPU 107 to supply the setting signals to the image capturing unit 42. The timing signal controls the timing of image capturing of the sensor unit 430. The light source drive signal controls the driving of the illumination light source 426 that illuminates the image capturing range of the sensor unit 430. The colorimetric controller 50 generates these timing signals and the light source drive signals to supply these signals to the image capturing unit 42.

The ROM 118 stores programs of, for example, procedures of processing executed by the host CPU 107 and various pieces of control data. The RAM 119 is used as working memory of the host CPU 107.

<Configuration of Control Mechanism of Colorimetric Device>

Figure 7:
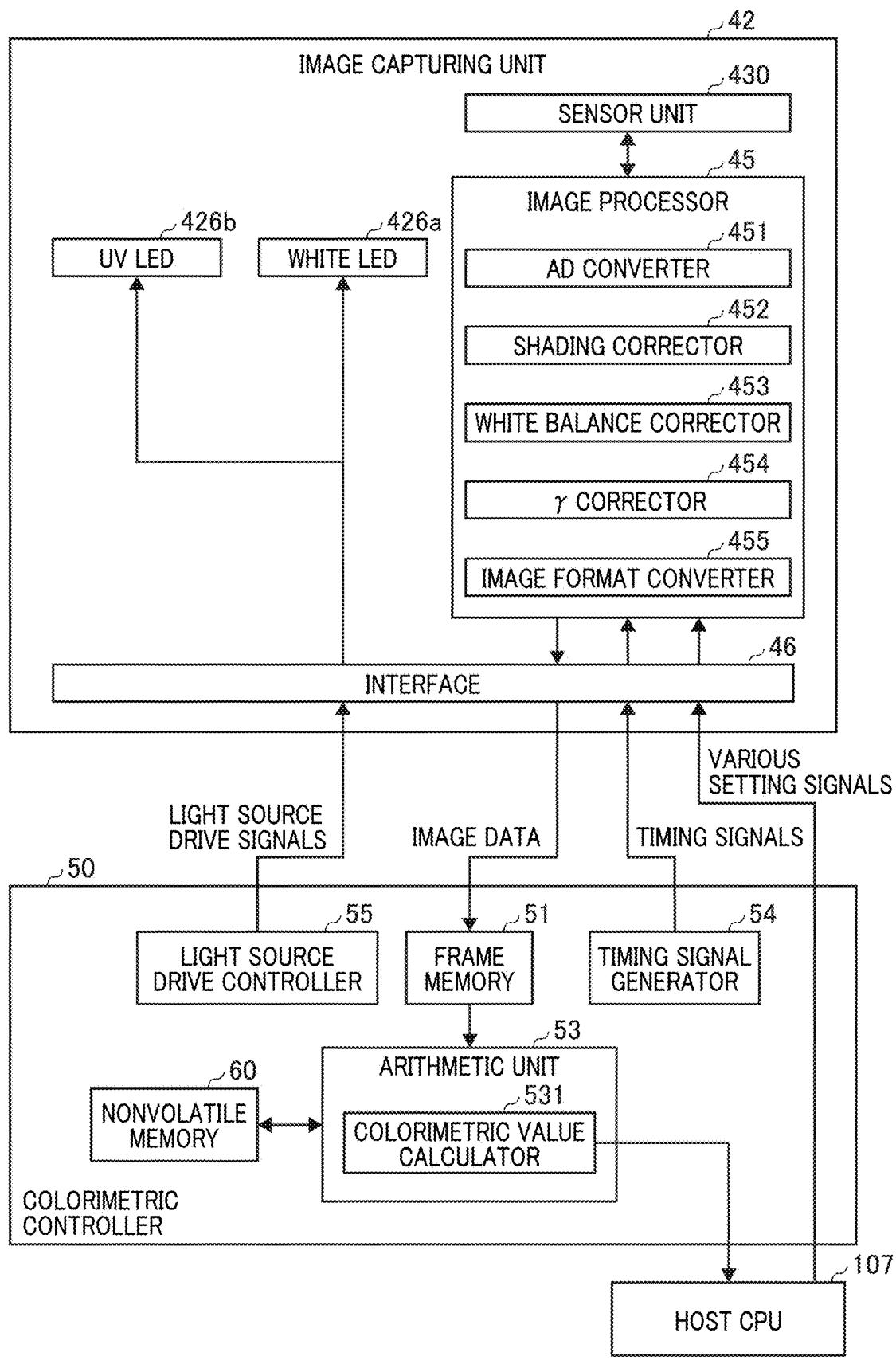
FIG. 7 is a block diagram illustrating one exemplary configuration of a control mechanism of a colorimetric device.

A control mechanism of the colorimetric device will now be specifically described with reference to FIG. 7. FIG. 7 is a block diagram illustrating one exemplary configuration of the control mechanism of the colorimetric device.

The colorimetric device includes the image capturing unit 42 and the colorimetric controller 50. The image capturing unit 42 further includes an image processor 45 and an interface 46 in addition to the sensor unit 430 and the illumination light source 426 described above. Although, in the embodiment, the image processor 45 is separated from the sensor unit 430, the two-dimensional image sensor 431 of the sensor unit 430 may have the function of the image processor 45.

The image processor 45 processes data of an image captured by the sensor unit 430. The image processor 45 includes an analog-digital (AD) converter 451, a shading corrector 452, a white balance corrector 453, a γ corrector 454, and an image format converter 455.

The AD converter 451 performs AD conversion of an analog signal output from the sensor unit 430.

The shading corrector 452 corrects the error of the image data caused by uneven illuminance of illumination from the illumination light source 426 over the image capturing range of the sensor unit 430.

The white balance corrector 453 corrects white balance of the image data.

The γ corrector 454 corrects the image data so as to compensate for linearity of the sensitivity of the sensor unit 430.

The image format converter 455 converts the image data into any format.

The interface 46 is used for the image capturing unit 42 to acquire the various setting signals, the timing signals, and the light source drive signals, which are transmitted from the colorimetric controller 50. The interface 46 is used for transmitting the image data from the image capturing unit 42 to the colorimetric controller 50.

The colorimetric controller 50 as an example of control circuitry includes a frame memory 51, an arithmetic unit 53, a timing signal generator 54, a light source drive controller 55, and a nonvolatile memory 60.

The frame memory 51 temporarily stores the image data transmitted from the image capturing unit 42.

At least either (both, in FIG. 8) of an L*a*b* value and an XYZ value is stored in a memory table Tb1 in the nonvolatile memory 60 as a reference colorimetric value in accordance with patch numbers. The L*a*b* value and XYZ value are colorimetric values of colorimetric results of a plurality of reference color patches KP from a spectroscope (colorimetric device) BS. The plurality of reference color patches KP is arranged on a reference sheet KS.

The nonvolatile memory 60 also stores a read RGB value (Rd, Gd, and Bd) of each patch of the reference chart 400 when the white LED 426a is put on and when the UV LED 426b is put on.

The nonvolatile memory 60 also stores read RGB value (Rd', Gd', and Bd') of each patch of the reference chart 400 at the time of colorimetry with the white LED 426a and with the UV LED 426b.

The arithmetic unit 53 includes a colorimetric value calculator (calculator) 531. The arithmetic unit 53 includes a processor such as a CPU. The arithmetic unit 53 executes a predetermined program with the processor to implement the function of the colorimetric value calculator 531. Although, in the embodiment, software implements the colorimetric value calculator 531 of the arithmetic unit 53, dedicated hardware such as application specific integrated circuit (ASIC) and field-programmable gate array (FPGA) can implement a part or all of the colorimetric value calculator 531.

When the sensor unit 430 of the image capturing unit 42 captures the patch image 200, which is a colorimetric target, the colorimetric value calculator 531 calculates the colorimetric value of the patch image 200 based on the patch image 200 obtained by the image capturing. The colorimetric value of the patch image 200 calculated by the colorimetric value calculator 531 is transmitted to the host CPU 107. A specific example of processing of the colorimetric value calculator 531 will be described in detail later.

The timing signal generator 54 generates a timing signal for controlling timing of image capturing of the sensor unit 430 of the image capturing unit 42, and supplies the timing signal to the image capturing unit 42.

The light source drive controller 55 generates a light source drive signal for driving the illumination light source 426 (white LED 426a and UV LED 426b) of the image capturing unit 42, and supplies the light source drive signal to the image capturing unit 42. The light source drive controller 55 functions as a first light amount adjuster and a second light amount adjuster.

<Colorimetric Method for Patch Image>

A colorimetric method for the patch image 200 with the image forming apparatus 100 according to the embodiment will now be described in detail. The colorimetric method includes preprocessing and colorimetric processing. The preprocessing is performed when the image forming apparatus 100 is in an initial state (when in the initial state owing to manufacture or overhaul). The colorimetric processing is performed at the time when a color adjustment for the image forming apparatus 100 is performed.

FIG. 8 illustrates processing of acquiring the reference colorimetric value and a reference RGB value and processing of generating a reference value linear conversion matrix. These pieces of processing illustrated in FIG. 8 are executed as the preprocessing. In the preprocessing, a reference sheet KS on which a plurality of reference patches KP is arranged is used. Although the reference patch KP on the reference sheet KS may be equivalent to the patch on the reference chart 400 of the image capturing unit 42, the number of reference patches KP is preferably larger than the number of patches of the reference chart 400.

At least either (both, in the example of FIG. 8) of the L*a*b* value and the XYZ value are stored in, for example, the memory table Tb1 in the nonvolatile memory 60 inside the colorimetric controller 50 in accordance with patch numbers. The L*a*b* value and XYZ value are colorimetric values of a plurality of reference patches KP of on the reference sheet KS. The colorimetric value of the reference patch KP is preliminarily obtained by colorimetry with, for example, the spectroscope BS. When the colorimetric value of the reference patch KP is known, the value may be used. The colorimetric value of the reference patch KP stored in the memory table Tb1 will hereinafter be referred to as a "reference colorimetric value".

The reference sheet KS is set on the platen plate 22, and movement of the carriage 5 is controlled. The image capturing unit 42 captures images of the plurality of reference patches KP being the objects on the reference sheet KS.

The RGB value of each patch (initial reference color patch) of the reference sheet KS obtained by image capturing of the image capturing unit 42 is stored in the memory table Tb1 of the nonvolatile memory 60 in accordance with the patch number. That is, the colorimetric value and the RGB value of each of the plurality of reference patches KP arranged on the reference sheet KS are stored in the memory table Tb1 in accordance with the patch number of each reference patch KP. The RGB value of the reference patch KP stored in the memory table Tb1 will hereinafter be referred to as a "reference RGB value". The reference RGB value reflects characteristics of the image capturing unit 42.

When the reference colorimetric value and the reference RGB value of the reference patch KP are stored in the memory table Tb1 of the nonvolatile memory 60, the host CPU 107 of the image forming apparatus 100 generates the reference value linear conversion matrix, and stores the matrix in the nonvolatile memory 60. The reference value linear conversion matrix converts a pair of the XYZ value, which is the reference colorimetric value of the same patch number, and the reference RGB value into each other. When the L*a*b* value is stored alone in the memory table Tb1 as the reference colorimetric value, the L*a*b* value may be converted into the XYZ value by using a known conversion expression for converting the L*a*b* value into the XYZ value to generate the reference value linear conversion matrix.

Figures 9A, 9B:
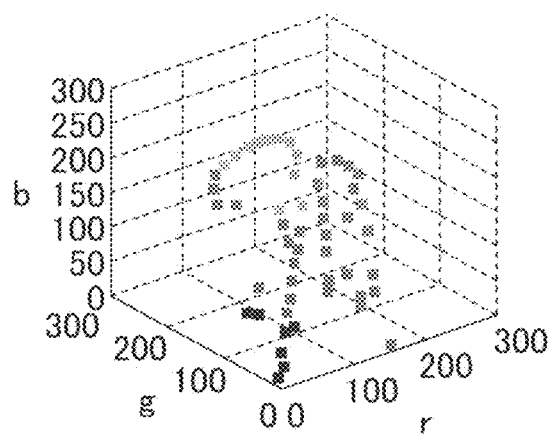
FIGS. 9A and 9B illustrate one example of an initial reference RGB value.

When the image capturing unit 42 captures images of the plurality of reference patches KP on the reference sheet KS, the image capturing unit 42 captures an image of the reference chart 400 in the image capturing unit 42 at the same time. The RGB value of each patch of the reference chart 400 obtained by the image capturing is also stored in the memory table Tb1 of the nonvolatile memory 60 in accordance with the patch number. The RGB value of the patch of the reference chart 400 stored in the memory table Tb1 through the preprocessing will be referred to as an "initial reference RGB value". FIGS. 9A and 9B illustrate one example of the initial reference RGB value. FIG. 9A illustrates the initial reference RGB value (RdGdBd) stored in the memory table Tb1. FIG. 9A illustrates an initial reference Lab value (Ldadbd) and an initial reference XYZ value (XdYdZd) stored in association with one another together with the initial reference RGB value (RdGdBd). The initial reference Lab value (Ldadbd) is obtained by converting the initial reference RGB value (RdGdBd) into the Lab value. The initial reference XYZ value (XdYdZd) is obtained by converting the initial reference RGB value (RdGdBd) into the XYZ value. FIG. 9B is a scatter diagram with plotted initial reference RGB values of the patches on the reference chart 400.

After the above-described preprocessing is finished, the host CPU 107 in the image forming apparatus 100 performs main scanning movement control over the carriage 5, conveyance control over a recording medium P with the paper conveyor 112, and drive control over the recording head 6 based on, for example, image data input from the outside and print setting. While intermittently conveying the recording medium P, the host CPU 107 controls ink discharge from the recording head 6 to output an image onto the recording medium P. A discharge amount of ink from the recording head 6 may change due to, for example, characteristics peculiar to the device or temporal change. When the discharge amount of ink changes, an image is formed with color different from image color intended by a user, resulting in deterioration in color reproducibility. The image forming apparatus 100 thus performs colorimetric processing for determining a colorimetric value of the patch image 200 at predetermined timing of color adjustment. The color adjustment based on the colorimetric value that is determined by the colorimetric processing improves the color reproducibility.

Figure 10:
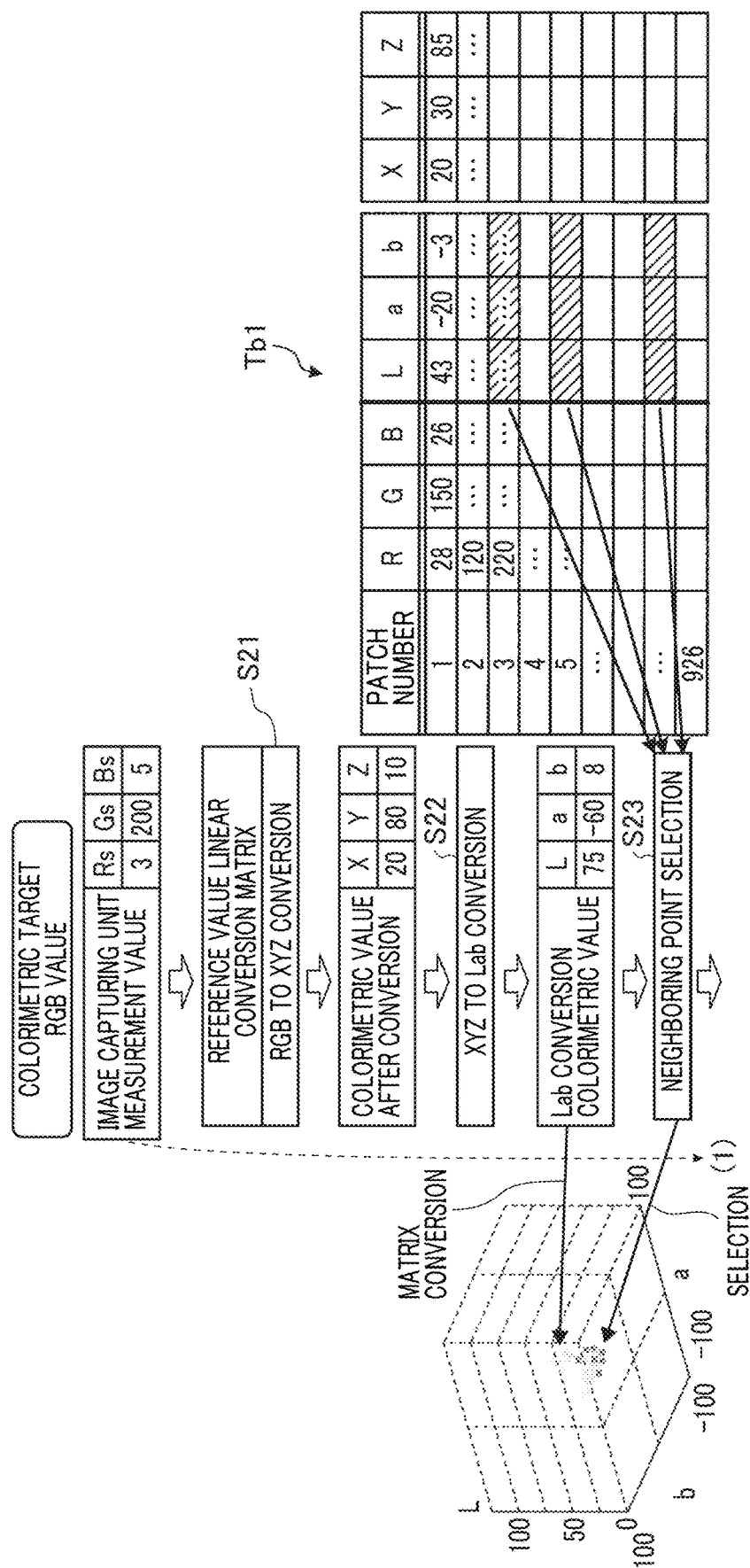
FIG. 10 illustrates basic colorimetric processing.
Figure 11:
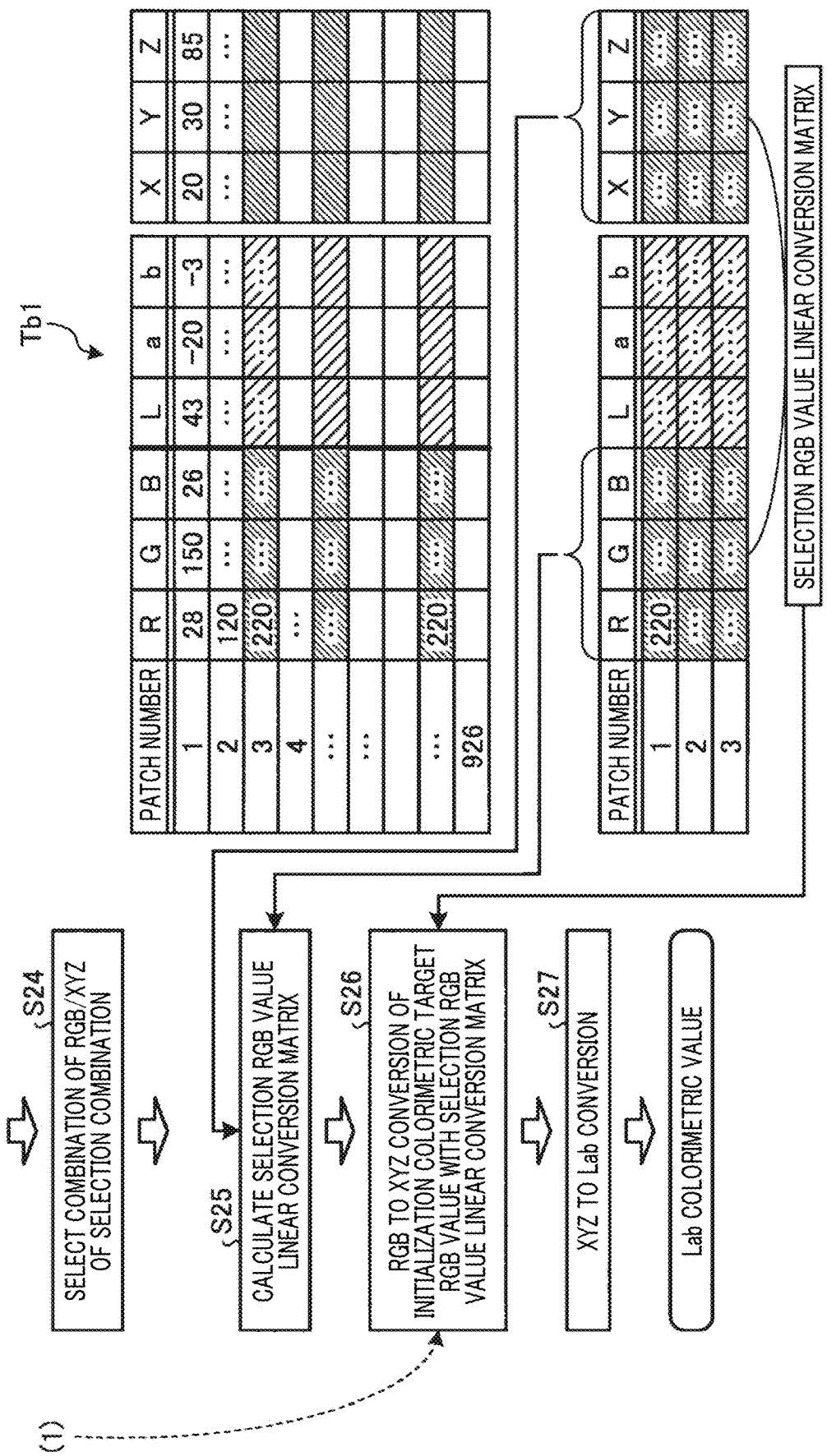
FIG. 11 illustrates the basic colorimetric processing.

FIGS. 10 and 11 illustrate basic colorimetric processing. The colorimetric value calculator 531 reads the reference value linear conversion matrix that is generated in the preprocessing and stored in the nonvolatile memory 60, converts a colorimetric target RGB value (RsGsBs) into a first XYZ value with the reference value linear conversion matrix, and stores the first XYZ value in the nonvolatile memory 60 (Step S21). FIG. 10 illustrates an example in which an initialization colorimetric target RGB value (3, 200, 5) is converted into a first XYZ value (20, 80, 10) with the reference value linear conversion matrix.

The colorimetric value calculator 531 converts the first XYZ value, which is converted from the colorimetric target RGB value (RsGsBs) in Step S21, into a first L*a*b* value through the known conversion expression, and stores the first L*a*b* value in the nonvolatile memory 60 (Step S22). FIG. 10 illustrates an example in which the first XYZ value (20, 80, 10) is converted into a first L*a*b* value (75, −60, 8) through the known conversion expression.

The colorimetric value calculator 531 searches for a plurality of reference colorimetric values (L*a*b* values) stored in the memory table Tb1 of the nonvolatile memory 60 in the preprocessing. The colorimetric value calculator 531 selects a combination of a plurality of patches (neighboring color patches) having a reference colorimetric value (L*a*b* value) that is close in distance to the first L*a*b* value in L*a*b* space (Step S23). In order to select patches that are close in distance, for example, a method of calculating distances between the first L*a*b* value and all the reference colorimetric value (L*a*b* value) stored in the memory table Tb1, and selecting a plurality of patches having an L*a*b* value (hatched L*a*b* value in FIG. 10) that is close in distance to the first L*a*b* value can be used.

As illustrated in FIG. 11, the colorimetric value calculator 531 picks up the RGB value (reference RGB value) paired with the L*a*b* value and the XYZ value for each of the neighboring color patches selected in Step S23 with reference to the memory table Tb1, and selects a combination of the RGB value and the XYZ value from the plurality of RGB and XYZ values (Step S24). The colorimetric value calculator 531 calculates a selection RGB value linear conversion matrix for converting the selected combination (selection combination) of the RGB value into the XYZ value by, for example, a method of least square. The colorimetric value calculator 531 stores the selection RGB value linear conversion matrix in the nonvolatile memory 60 (Step S25).

The colorimetric value calculator 531 converts the colorimetric target RGB value (RsGsBs) into a second XYZ value with the selection RGB value linear conversion matrix generated in Step S25 (Step S26). The colorimetric value calculator 531 converts the second XYZ value determined in Step S26 into a second L*a*b* value through the known conversion expression (Step S27), and sets the determined second L*a*b* value to be a final colorimetric value of the patch image 200, which is a colorimetric target. The color adjustment based on the colorimetric value that is determined by the above-described colorimetric processing improves the color reproducibility of the image forming apparatus 100.

A "reference patch Rd'Gd'Bd' value upon colorimetry" may fail to coincide with an "initial reference patch RdGdBd value" owing to the "reference patch Rd'Gd'Bd' value upon colorimetry" varying upon actual measurement of the colorimetric target. Possible causes of the variation include temporal change of an illumination light source and temporal change in sensor sensitivity. If conversion is performed by using the selection RGB value linear conversion matrix with the reference patch Rd'Gd'Bd' value upon colorimetry kept varied, the final colorimetric value is also varied. This may prevent colorimetry with high accuracy.

In the embodiment, an LED light amount and sensor sensitivity (white balance and γ correction) are adjusted before colorimetry, so that the "reference patch Rd'Gd'Bd' value upon colorimetry" always coincides with the "initial reference patch RdGdBd value".

Figure 12:
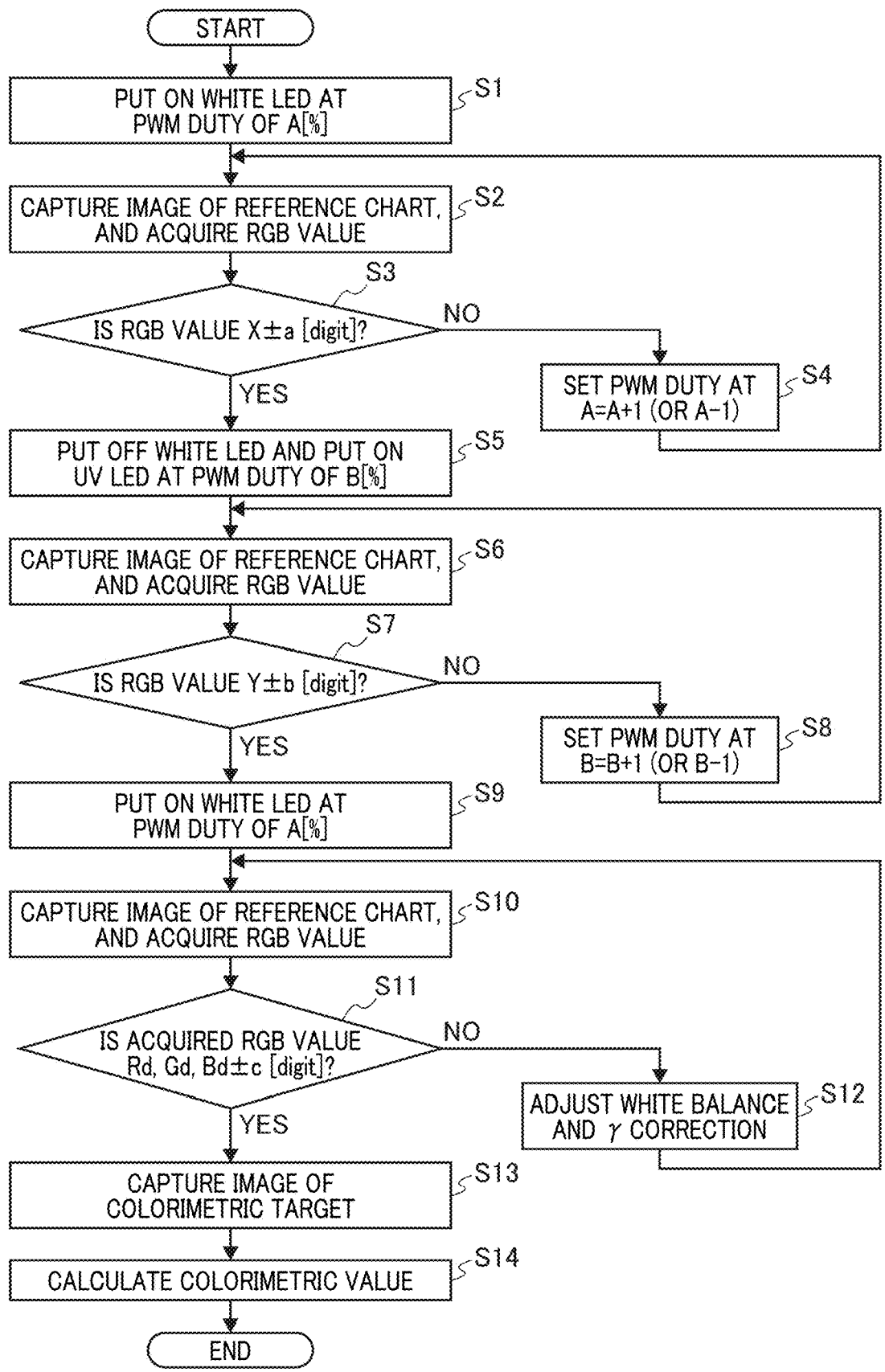
FIG. 12 is a flowchart schematically illustrating a flow of the adjustment of a light amount and a sensor before colorimetry and the colorimetric processing.

FIG. 12 is a flowchart schematically illustrating a flow of the adjustment of a light amount and a sensor before colorimetry and the colorimetric processing. As illustrated in FIG. 12, the colorimetric value calculator 531 puts on a white LED 426a at a pulse width modulation (PWM) Duty of A [%] (Step S1), captures an image of the reference chart 400, and acquires an RGB value of a reference patch for adjusting a white LED (Step S2).

The colorimetric value calculator 531 determines whether the value of G is X±a [digit] (Step S3). Adjustment may be performed not with the value of G but with the value of R or B.

When the value of G is determined not to be X±a [digit] (No in Step S3), the colorimetric value calculator 531 performs setting as follows. When the value of G is smaller than X±a [digit], the colorimetric value calculator 531 sets the PWM Duty at A=A+1 [%], and when the value of G is larger than X±a [digit], the colorimetric value calculator 531 sets the PWM Duty at A=A−1 [%] (Step S4). The colorimetric value calculator 531 returns to Step S2.

When the value of G is determined to be X±a [digit] (Yes in Step S3), the colorimetric value calculator 531 proceeds to Step S5.

The light amount adjustment for the white LED 426a is completed through the processing of Steps S1 to S4.

The colorimetric value calculator 531 puts off the white LED 426a and puts on the UV LED 426b alone at a PWM Duty of B [%] (Step S5), captures an image of the reference chart 400, and acquires an RGB value of a reference patch for adjusting a UV LED (Step S6).

The colorimetric value calculator 531 determines whether the value of G is Y±b [digit] (Step S7). Adjustment may be performed not with the value of G but with the value of R or B.

When the value of G is determined not to be Y±b [digit] (No in Step S7), the colorimetric value calculator 531 performs setting as follows. When the value of G is smaller than Y±b [digit], the colorimetric value calculator 531 sets the PWM Duty at B=B+1 [%], and when the value of G is larger than Y±b [digit], the colorimetric value calculator 531 sets the PWM Duty at B=B−1 [%] (Step S8). The colorimetric value calculator 531 returns to Step S6.

When the value of G is determined to be Y±b [digit] (Yes in Step S7), the colorimetric value calculator 531 proceeds to Step S9.

The light amount adjustment for the UV LED 426b is completed through the processing of Steps S5 to S8.

The peak light amount of the UV LED 426b is set to approximately half or less of the peak of the white LED 426a in the vicinity of 400 to 500 nm. The purpose of this is to set the balance of ultraviolet light to white light to D65 and prevent a fluorescent object from fluorescing. This setting can improve the accuracy of colorimetry.

The colorimetric value calculator 531 puts on the white LED 426a in the light amount adjusted in Steps S1 to S4 (Step S9). As a result, both of the white LED 426a and the UV LED 426b are lit.

The colorimetric value calculator 531 captures an image of the reference chart, and acquires an RGB value of a reference patch for white balance/γ corrections (Step S10).

The colorimetric value calculator 531 determines whether the R, G, an B values are Rd±c [digit], Gd±c [digit], and Bd±c [digit], respectively (Step S11).

When the R, G, and B values are determined not to be Rd±c [digit], Gd±c [digit], and Bd±c [digit], respectively (No in Step S11), the colorimetric value calculator 531 performs white balance/γ adjustments (Step S12), and returns to Step S10.

When the R, G, and B values are Rd±c [digit], Gd±c [digit], and Bd±c [digit], respectively (Yes in Step S11), the colorimetric value calculator 531 finishes the processing.

Adjustment of white balance and γ correction of the image sensor is completed through the Steps S9 to S12.

The white LED 426a and the UV LED 426b are put on in the light amount adjusted in steps S4 and S8, and an image of the colorimetric target is captured. The RGB value of the colorimetric target whose image is captured is corrected with the white balance and γ correction value set in the processing of Step S9 to S12 to be output as a colorimetric target RsGsBs (Step S13).

A colorimetric value is calculated by the above-described colorimetric method (Step S14).

According to the embodiment, an optical sensor device that can be used for accurate colorimetry can be provided inexpensively.

Although, in the embodiment, the reference patch for adjusting a white LED and the reference patch for adjusting a UV LED are used for the white LED 426a and the UV LED 426b, respectively, upon adjustment of the LED light amount and the sensor sensitivity (white balance and γ correction), the patches are not limitative. The same patches with different threshold values may be used.

Second Embodiment

The second embodiment will now be described.

An image capturing unit of the image forming apparatus 100 in the second embodiment is different from the image capturing unit in the first embodiment. In the following description of the second embodiment, descriptions of the same parts as parts in the first embodiment will be omitted. Portions different from portions in the first embodiment will be described.

Figure 13:
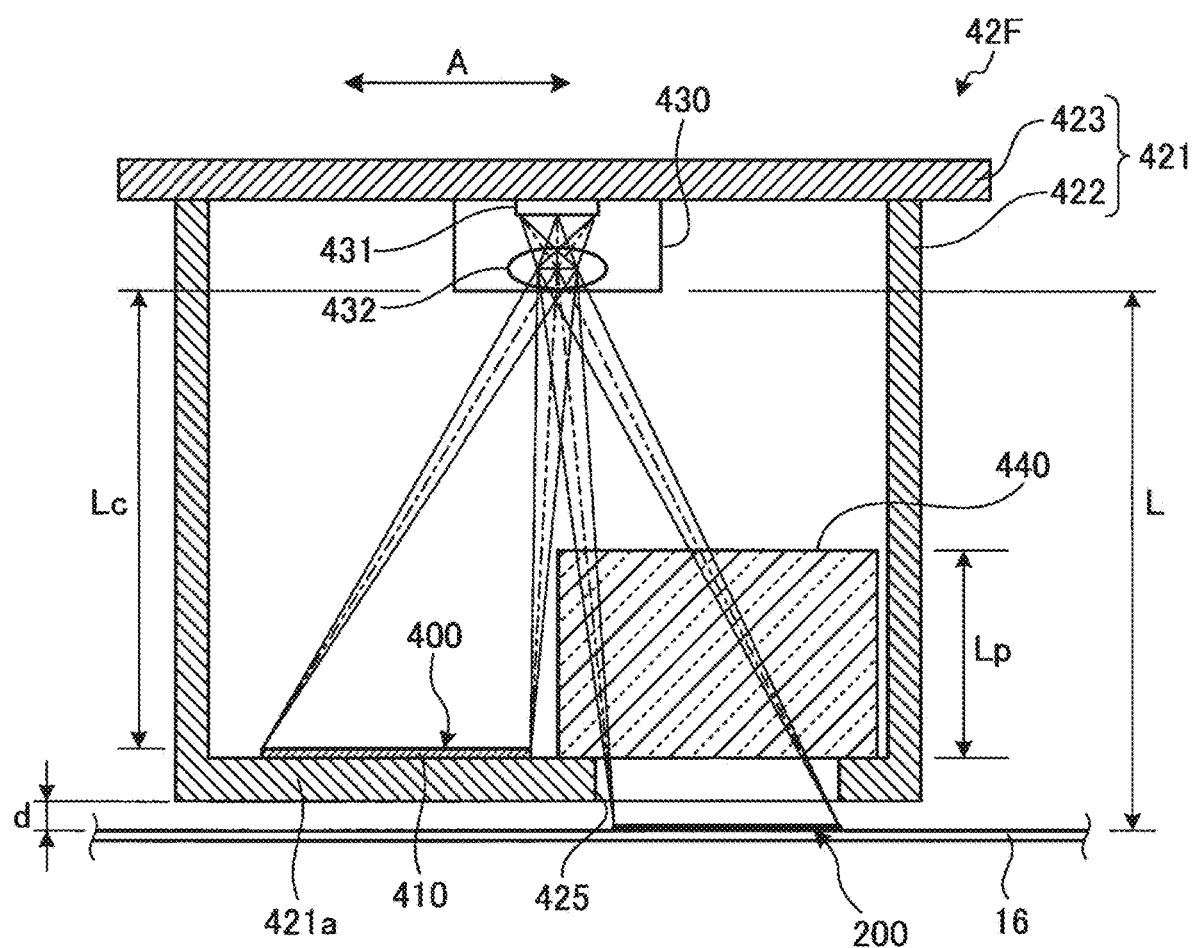
FIG. 13 is a vertical cross-sectional view of an image capturing unit according to a second embodiment.

FIG. 13 is a vertical cross-sectional view of an image capturing unit 42F according to the second embodiment. The image capturing unit 42F is at the same position as the image capturing unit 42 in the vertical cross-sectional view of FIG. 4-1.

The image capturing unit 42F according to the second embodiment has an optical-path-length changer 440 disposed inside the housing 421. The optical-path-length changer 440 is an optical element that has a refractive index n (the reference character n has any number) and transmits light. The optical-path-length changer 440 is disposed in an optical path between an object (patch image 200) outside the housing 421 and the sensor unit 430. The optical-path-length changer 440 brings a surface on which an optical image of the object (patch image 200) is formed close to a surface on which an optical image of the reference chart 400 is formed. That is, in the image capturing unit 42F according to the second embodiment, the optical-path-length changer 440 disposed in the optical path between the object (patch image 200) and the sensor unit 430 brings both of the surface on which the optical image of the object (patch image 200) outside the housing 421 is formed and a surface on which the image of the reference chart 400 inside the housing 421 is formed on the sensor surface of the two-dimensional image sensor 431 of the sensor unit 430. Although FIG. 13 illustrates an example in which the optical-path-length changer 440 is placed over the bottom surface portion 421a of the housing 421, the optical-path-length changer 440 is not necessarily required to be placed over the bottom surface portion 421a. The optical-path-length changer 440 is required to be disposed in the optical path between the object (patch image 200) outside the housing 421 and the sensor unit 430.

When light passes through the optical-path-length changer 440, an optical path length is increased in accordance with the refractive index n of the optical-path-length changer 440, and an image appears to be lifted up. A lifting amount C of the image can be determined by the following expression.

$$C = Lp(1 - 1/n)$$

where Lp represents the length of the optical-path-length changer 440 in an optical axis direction.

A length L between the principal point of the image forming lens 432 and a front focal plane (image capturing surface) of an optical image transmitted through the optical-path-length changer 440 can be determined by the following expression.

$$L = Lc + Lp(1 - 1/n)$$

Where Lc represents the distance between the principal point of the image forming lens 432 of the sensor unit 430 and the reference chart 400.

When the optical-path-length changer 440 has a refractive index n of 1.5, the expression $L = Lc + Lp \, (1/3)$ holds. The optical path length of the optical image transmitted through the optical-path-length changer 440 can be increased by approximately 1/3 of the length Lp of the optical-path-length changer 440 in the optical axis direction. In the case, when, for example, Lp=9 [mm], the expression L=Lc+3 [mm] holds. When image capturing is performed in the state where the difference between the distance from the sensor unit 430 to the reference chart 400 and the distance to the object (patch image 200) is 3 mm, both of a back focal plane (image forming surface) of the optical image of the reference chart 400 and a back focal plane (image forming surface) of the optical image of the object (patch image 200) are brought on the sensor surface of the two-dimensional image sensor 431 of the sensor unit 430.

In the image capturing unit 42F according to the second embodiment as described above, the optical-path-length changer 440 disposed in the optical path between the object (patch image 200) and the sensor unit 430 brings the surface on which the optical image of the object (patch image 200) is formed close to the surface on which the optical image of the reference chart 400 is formed, so that an appropriate image focused on both of the object (patch image 200) and the reference chart 400 can be captured.

Third Embodiment

The third embodiment will now be described.

The image forming apparatus 100 according to the third embodiment is different from the image forming apparatus 100 of the first embodiment in that the image forming apparatus 100 according to the third embodiment includes a reflective colorimetric sensor instead of the two-dimensional image sensor 431. In the following description of the third embodiment, descriptions of the same parts as parts in the first embodiment will be omitted. Portions different from portions in the first embodiment will be described.

Figure 14A:
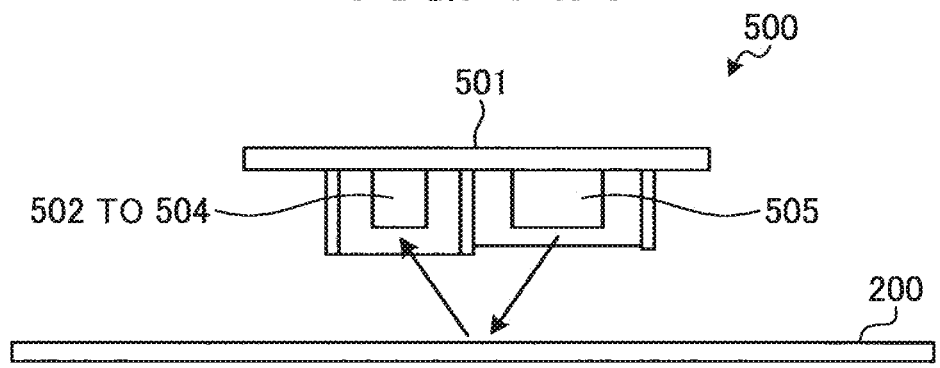
FIGS. 14A and 14B illustrate the configuration of a reflective colorimetric sensor according to a third embodiment.
Figure 14B:
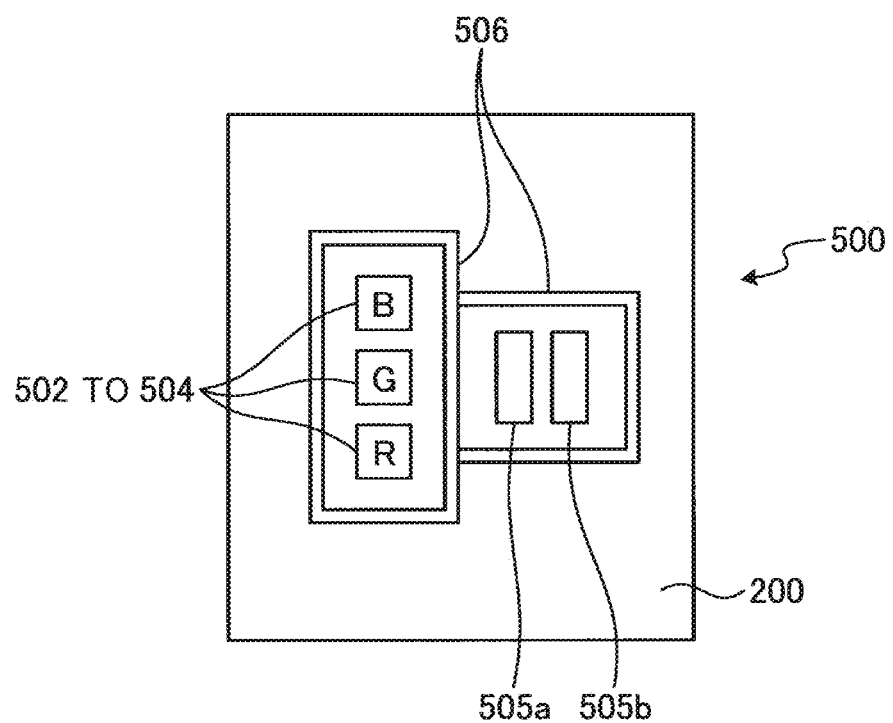

FIGS. 14A and 14B illustrate the configuration of a reflective colorimetric sensor 500 according to the third embodiment. FIG. 14A is a side view. FIG. 14B is a back view. As illustrated in FIGS. 14A and 14B, the reflective colorimetric sensor 500 includes a plurality of light receiving elements 502, 503, and 504 on printed circuit board 501. The light receiving elements 502, 503, and 504 have a different spectral sensitivity. Although, in the example in FIGS. 14A and 14B, three light receiving elements 502, 503, and 504 having the sensitivity of RGB are arranged, further light receiving elements having other spectral sensitivities for a color such as gray, cyan, and orange may be arranged together.

The reflective colorimetric sensor 500 includes light emitting elements 505a and 505b near the light receiving elements 502, 503, and 504. The light emitting element 505a in the embodiment corresponds to the white LED 426a described in the first embodiment. The light emitting element 505b corresponds to the UV LED 426b described in the first embodiment.

The reflective colorimetric sensor 500 includes light shading walls 506 for preventing stray light around the light receiving elements 502, 503, and 504 and the light emitting elements 505a and 505b.

Light emitted from the light emitting elements 505a and 505b hits the patch image 200 and the reference chart 400, which are to be colorimetric targets. Irregularly or regularly reflected light uniformly enter each of the light receiving elements 502, 503, and 504.

The light receiving elements 502, 503, and 504 output an RGB signal in response to the amount of received light. The RGB signal is amplified by an amplifier, and converted into a digital value by an AD converter. Also in the example, the light emitting elements 505a and 505b are sequentially put on. The setting of the PWM Duty and adjustment of white balance and a γ correction value are performed. In the case, a known reference is placed inside a device. The light emitting elements 505a and 505b are required to be sequentially put on over the reference point to perform the above-described adjustment.

According to the embodiment, an optical sensor device that can be used for accurate colorimetry can be provided inexpensively.

Fourth Embodiment

Next, a fourth embodiment is described.

The image forming apparatus 100 according to the fourth embodiment is different from the image forming apparatus 100 according to the first embodiment in that the sheet type can be determined even when a sheet to be printed contains a fluorescent whitening agent. In the following description of the third embodiment, descriptions of the same parts as parts in the first embodiment will be omitted. Parts different from parts in the first embodiment will be described.

Conventionally, there is known a technique of capturing an image of a sheet to be printed to determine the sheet type. However, according to a conventional technique, when a sheet to be printed contains a fluorescent whitening agent, the determination may be affected by the fluorescence and the sheet type may not be accurately determined.

Figure 15A:
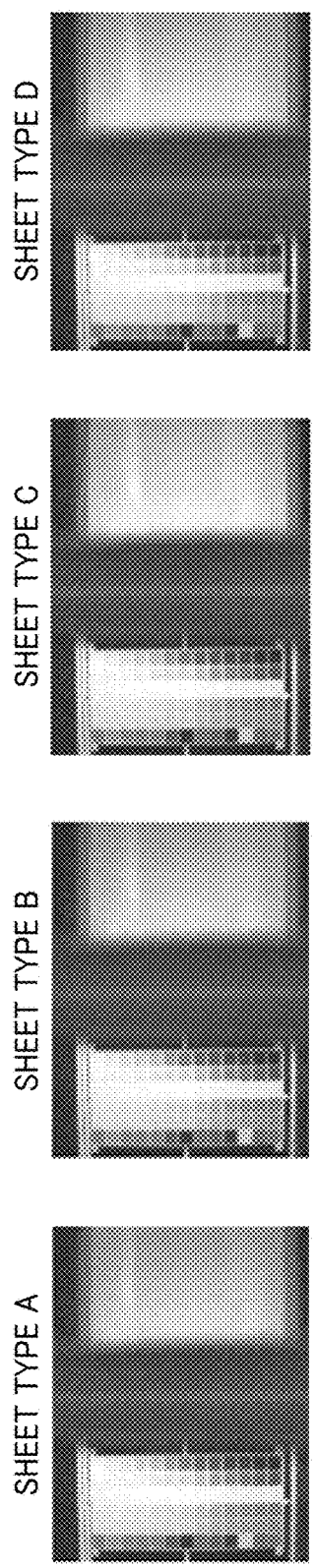
FIGS. 15A and 15B are diagrams of captured images for different sheet types in a fourth embodiment.
Figure 15B:
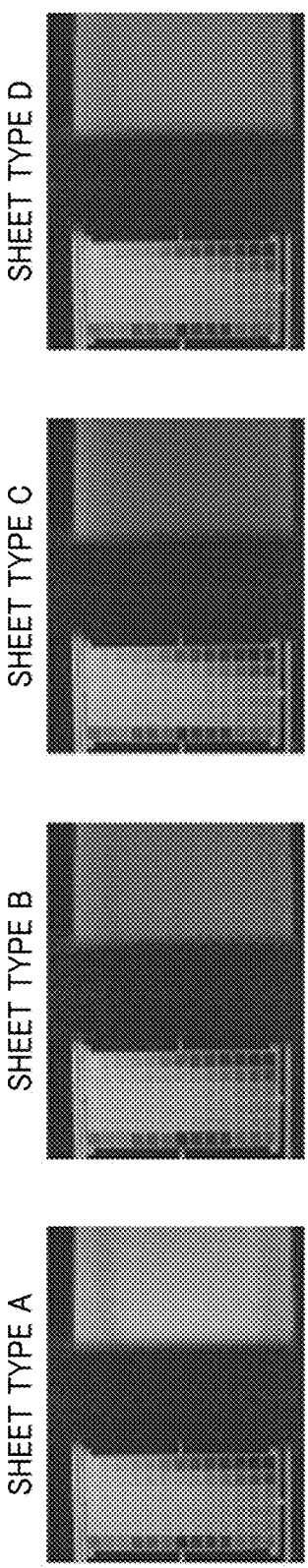

FIGS. 15A and 15B are diagrams of captured images for different sheet types in a fourth embodiment; FIG. 15A illustrates captured images for different sheet types when the white LED 426a is turned on. FIG. 15B illustrates captured images for different sheet types when the UV LED 426b is turned on. FIGS. 15A and 15B include captured images of (1) a sheet subjected to the nanoporous coating (sheet type A), (2) a sheet using a grid-shaped glue (sheet type B), (3) a sheet of a polyvinyl chloride film material (sheet type C), and (4) a cloth material sheet (sheet type D).

As illustrated in FIG. 15A, regarding the images captured when the white LED 426a is turned on, there is no large difference in RGB level even with a sheet containing a large amount of fluorescent whitening agent. By contrast, as illustrated in FIG. 15B, regarding the images captured when the UV LED 426b is turned on, the reflectance of the reflected light received by the two-dimensional image sensor 431 varies with the application amount of the fluorescent whitening agent, thus causing a difference in RGB level.

Therefore, the colorimetric value calculation unit 531 in the image forming apparatus 100 according to the present embodiment stores in advance the RGB values of the sheet containing the fluorescent whitening agent captured when the UV LED 426b is turned on, and compares the RGB values of the image of the determination target (sheet) captured by the UV LED 426b with the RGB values stored in advance to determine the sheet type.

Figures 16, 17:
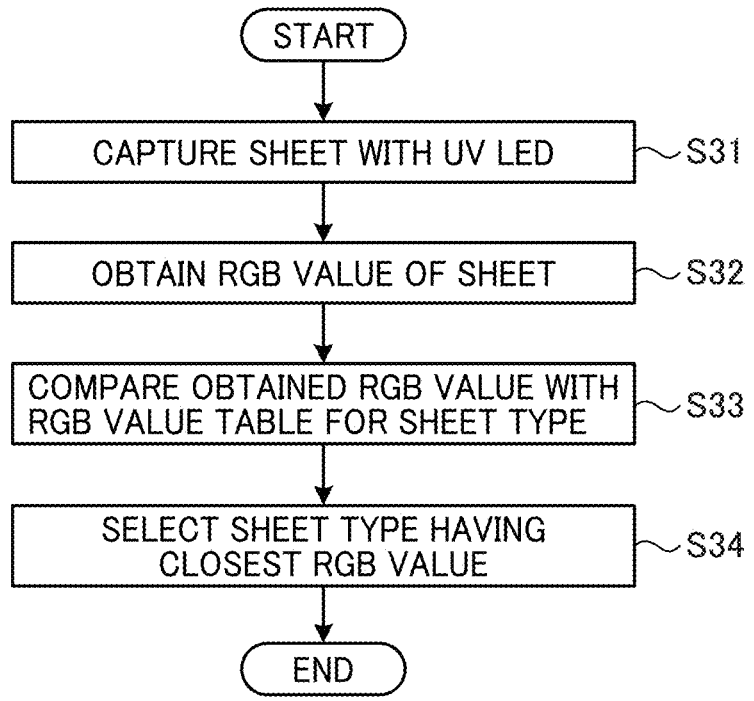
FIG. 16 is a chart of a table of RGB values for different sheet types.
FIG. 17 is a flowchart of a flow of a sheet-type determination process.

FIG. 16 is a chart of an example of a table of RGB values for different sheet types. FIG. 16 illustrates a table of RGB values for four sheet types different from each other. The table T of RGB values for different sheet types is stored, for example, in the non-volatile memory 60 and stores the RGB values for different sheet types containing the fluorescent whitening agent captured when the UV LED 426b is turned on.

After an image of the determination target (sheet) is captured, the colorimetric value calculator 531 of the colorimetric controller 50 compares the RGB values of the image captured with the UV LED 426b turned on with the table T of the RGB values for different sheet types and determines the sheet type based on the range of the sheet type the RGB values fall in. Thus, the sheet type can be determined even if the determination target (sheet) contains a fluorescent whitening agent.

Next, a flow of the sheet-type determination process is described.

FIG. 17 is a flowchart schematically illustrating the flow of the sheet-type determination process. The sheet-type determination process is executed after the light amount adjustment of the UV LED 426b in the colorimetric controller 50. The adjustment of the light amount of the UV LED 426b has been described with reference to FIG. 12. Therefore, descriptions thereof are omitted here.

As illustrated in FIG. 17, the colorimetric value calculator 531 first captures an image of a sheet with the two-dimensional image sensor 431 of the sensor unit 430, using the UV LED 426b (step S31).

Next, the colorimetric value calculator 531 obtains RGB values of the sheet from the captured image (step S32).

Next, the colorimetric value calculator 531 compares the B value of the obtained RGB values with the table T of RGB values according to the sheet type (step S33). Note that, instead of the B value, the G value or R value of the obtained RGB values may be compared with the table T of RGB values for different sheet types.

Next, the colorimetric value calculator 531 selects a closest B value from the comparison result in step S33, and determines the sheet type (step S34).

Next, preprocessing of color measurement using the sheet-type determination process is described.

Figure 18:
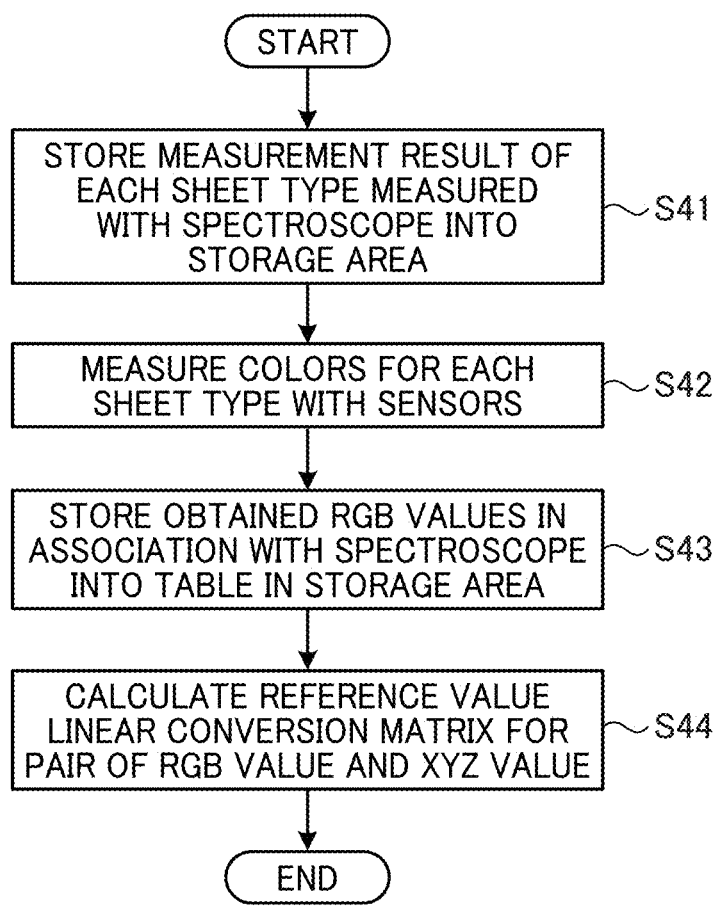
FIG. 18 is a flowchart of a flow of preprocessing of color measurement using a sheet-type determination process.

FIG. 18 is a flowchart of a flow of preprocessing of color measurement using a sheet-type determination process. As illustrated in FIG. 18, first, the colorimetric value calculator 531 stores colorimetric results with the spectroscope for different sheet types in the storage area (step S41).

Next, the colorimetric value calculator 531 measures colors of different sheet types with the white LED 426a and the UV LED 426b to obtain RGB values of the sheet (step S42).

Next, the colorimetric value calculator 531 stores the obtained RGB values in the table T of RGB values for different sheet types, in association with the colorimetric results of the spectroscope (step S43).

Next, the colorimetric value calculator 531 calculates a reference value linear conversion matrix for pairs of RGB values stored in the table T of RGB values for different sheet types and XYZ values that are reference colorimetric values (step S44).

The colorimetric value calculator 531 performs the color measurement process illustrated in FIG. 10 and the color measurement process illustrated in FIG. 11 using the calculated reference value linear conversion matrix.

By performing the above-described process, the reference value linear conversion matrix is determined for each sheet type, thus allowing colorimetric values to be more accurately calculated than when the sheet-type determination process is not performed.

As described above, according to the present embodiment, after an image of the determination target (sheet) is captured, the RGB values of the image captured using the UV LED 426b are compared with the table T of the RGB values for different sheet types to determine the sheet type based on the range of the sheet type the RGB values fall in. Thus, the sheet type can be determined even if the determination target (sheet) contains a fluorescent whitening agent.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An optical sensor device comprising:
a first light source having a plurality of peak wavelengths in a wavelength range of from 400 nm to 780 nm;
a second light source to emit ultraviolet light;
a sensor to receive light emitted by the first light source or the second light source and reflected by an object; and
control circuitry to:
adjust a light amount of the first light source based on an output of the sensor in a state where the first light source is turned on and the second light source is turned off;
adjust a light amount of the second light source based on an output of the sensor in a state where the second light source is turned on and the first light source is turned off; and
acquire a correction value of data output by the sensor, based on an output of the sensor in a state where each of the first light source and the second light source is turned on with the light amount adjusted by the control circuitry.

2. The optical sensor device according to claim 1, wherein the control circuitry adjusts the light amount of the first light source using a value of any one of R, G, and B output from the sensor.

3. The optical sensor device according to claim 1, wherein the control circuitry adjusts the light amount of the second light source using a value of any one of R, G, and B output from the sensor.

4. The optical sensor device according to claim 1, wherein the control circuitry adjusts white balance and y correction based on the correction value of the data.

5. A colorimetric device comprising:
the optical sensor device according to claim 1; and
a reference chart to be captured together with the object by the optical sensor device,
wherein the control circuitry calculates a colorimetric value of the object based on image capturing data of the object and the reference chart that are captured by the optical sensor device.

6. The colorimetric device according to claim 5, wherein the control circuitry includes a memory to store, in advance in a memory table, RGB values for different object types obtained by the sensor from objects captured using the second light source,
wherein the control circuitry determines a type of the object based on a result of comparison between an RGB value obtained by the sensor from the object captured using the second light source and the RGB values stored in the memory table.

7. The colorimetric device according to claim 6, wherein the control circuitry calculates a reference value linear conversion matrix for a pair of the RGB value of the object determined and a reference colorimetric value.

8. An image forming apparatus comprising:
an image output device to output an image onto a recording medium; and
the colorimetric device according to claim 5,
wherein the colorimetric device defines an image output by the image output device as the object and calculates a colorimetric value of the image, and
wherein, after the colorimetric device calculates the colorimetric value, the image output device outputs an image based on image data in which color adjustment is performed using the colorimetric value.

* * * * *